US012811259B2

(12) United States Patent
Honda et al.

(10) Patent No.: US 12,811,259 B2
(45) Date of Patent: Nov. 24, 2026

(54) BATTERY AND METHOD FOR MANUFACTURING BATTERY

(71) Applicant: Panasonic Intellectual Property Management Co., Ltd., Osaka (JP)

(72) Inventors: Kazuyoshi Honda, Osaka (JP); Koichi Hirano, Osaka (JP); Eiichi Koga, Hokkaido (JP); Kazuhiro Morioka, Osaka (JP); Akira Kawase, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 426 days.

(21) Appl. No.: 18/605,088

(22) Filed: Mar. 14, 2024

(65) Prior Publication Data

US 2024/0222808 A1 Jul. 4, 2024

Related U.S. Application Data

(63) Continuation of application No. PCT/JP2022/027918, filed on Jul. 15, 2022.

(30) Foreign Application Priority Data

Oct. 6, 2021 (JP) ................................ 2021-164981

(51) Int. Cl.

| | |
|---|---|
| ***H01M 50/533*** | (2021.01) |
| ***H01M 50/186*** | (2021.01) |
| ***H01M 50/207*** | (2021.01) |
| ***H01M 50/512*** | (2021.01) |

(52) U.S. Cl.
CPC ....... *H01M 50/533* (2021.01); *H01M 50/186* (2021.01); *H01M 50/207* (2021.01); *H01M 50/512* (2021.01)

(58) Field of Classification Search
CPC ............. H01M 50/533; H01M 50/186; H01M 50/207; H01M 50/512
See application file for complete search history.

(56) References Cited

FOREIGN PATENT DOCUMENTS

| | | |
|---|---|---|
| JP | 2008-198492 | 8/2008 |
| JP | 2013-120717 | 6/2013 |

OTHER PUBLICATIONS

International Search Report of PCT application No. PCT/JP2022/027918 dated Sep. 20, 2022.

*Primary Examiner* — Olatunji A Godo
(74) *Attorney, Agent, or Firm* — WHDA, LLP

(57) ABSTRACT

A battery includes: a power-generating element including battery cells electrically connected in parallel and laminated and each including an electrode layer, a counter electrode layer, and a solid electrolyte layer; an electrode insulation member; a counter electrode lead layer covering a first side surface and the electrode insulation member and electrically connected to the counter electrode layer of each of the battery cells; and a counter electrode current collector terminal provided at a first principal surface of the power-generating element. A resistance of a first portion, of the counter electrode lead layer, connected to the counter electrode layer of a battery cell disposed closest to the first principal surface among the battery cells is lower than a resistance of a second portion thereof connected to the counter electrode layer of a battery cell disposed farthest from the first principal surface among the battery cells.

20 Claims, 19 Drawing Sheets

BATTERY AND METHOD FOR MANUFACTURING BATTERY

BACKGROUND

1. Technical Field

The present disclosure relates to a battery and a method for manufacturing a battery.

2. Description of the Related Art

In related art, a battery in which plural battery cells with serial connection are connected in parallel is known. Examples of related art are disclosed in Japanese Unexamined Patent Application Publication No. 2013-120717 and Japanese Unexamined Patent Application Publication No. 2008-198492.

SUMMARY

Further improvements in battery characteristics over batteries according to related art are demanded.

One non-limiting and exemplary embodiment provides a high-performance battery a manufacturing method thereof.

In one general aspect, the techniques disclosed here feature a battery including: a power-generating element including a plurality of battery cells each including an electrode layer, a counter electrode layer, and a solid electrolyte layer located between the electrode layer and the counter electrode layer, the plurality of battery cells being electrically connected in parallel and being laminated; an electrode insulation member covering the electrode layer of each of the plurality of battery cells at a first side surface of the power-generating element; a counter electrode lead layer covering the first side surface and the electrode insulation member and electrically connected to the counter electrode layer of each of the plurality of battery cells; and a counter electrode current collector terminal provided at a first principal surface of the power-generating element and connected to the counter electrode lead layer, wherein a resistance of a first portion, of the counter electrode lead layer, connected to the counter electrode layer of a battery cell disposed closest to the first principal surface among the plurality of battery cells is lower than a resistance of a second portion, of the counter electrode lead layer, connected to the counter electrode layer of a battery cell disposed farthest from the first principal surface among the plurality of battery cells.

One non-limiting and exemplary embodiment makes it possible to provide a high-performance battery a manufacturing method thereof.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTIONS

Overview of Present Disclosure

Figure 1:
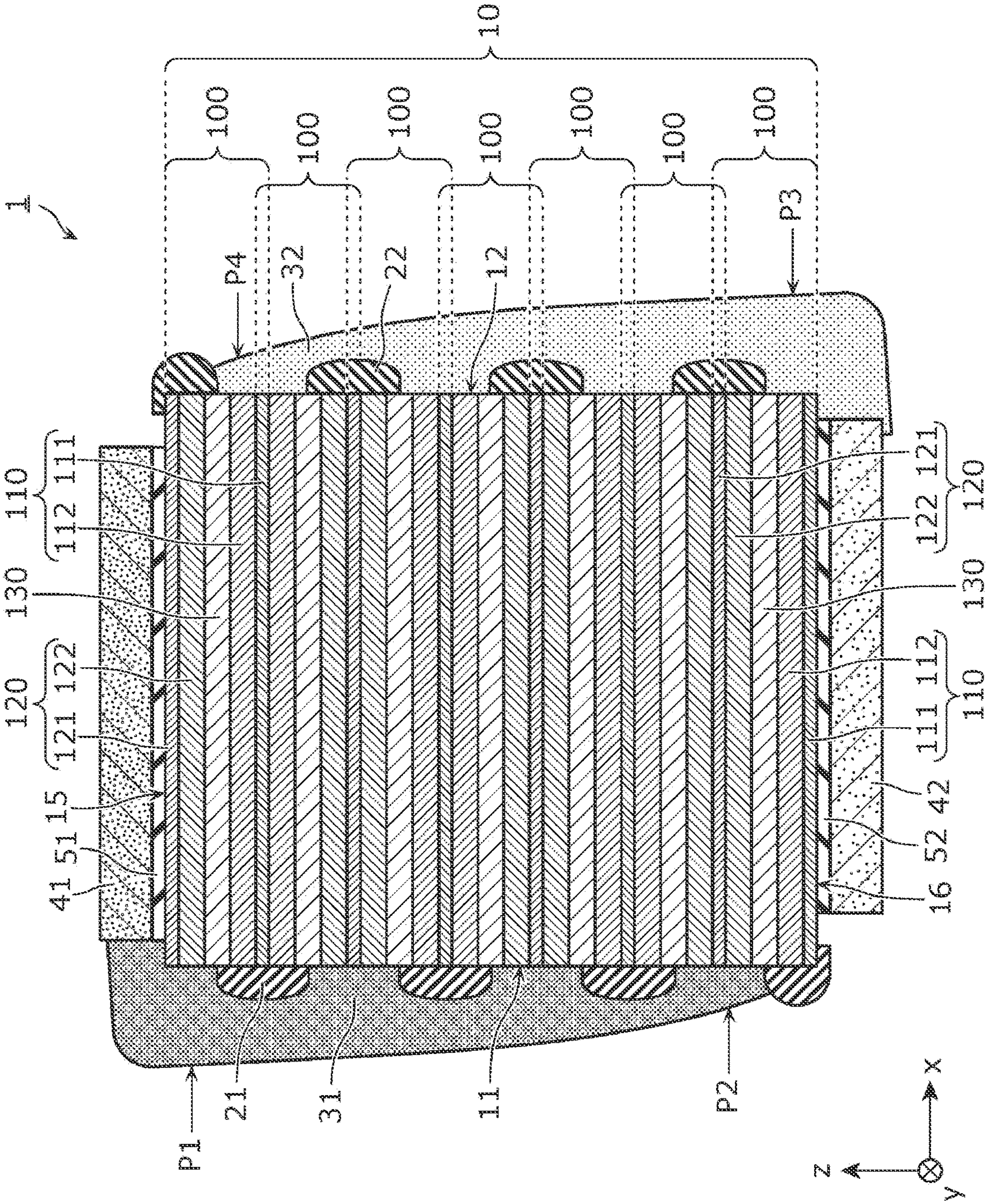
FIG. 1 is a cross-sectional view of a battery according to a first embodiment.

A battery according to an aspect of the present disclosure includes: a power-generating element including a plurality of battery cells each including an electrode layer, a counter electrode layer, and a solid electrolyte layer located between the electrode layer and the counter electrode layer, the plurality of battery cells being electrically connected in parallel and being laminated; an electrode insulation member covering the electrode layer of each of the plurality of battery cells at a first side surface of the power-generating element; a counter electrode lead layer covering the first side surface and the electrode insulation member and electrically connected to the counter electrode layer of each of the plurality of battery cells; and a counter electrode current collector terminal provided at a first principal surface of the power-generating element and connected to the counter electrode lead layer, wherein a resistance of a first portion, of the counter electrode lead layer, connected to the counter electrode layer of a battery cell disposed closest to the first principal surface among the plurality of battery cells is lower than a resistance of a second portion, of the counter electrode lead layer, connected to the counter electrode layer of a battery cell disposed farthest from the first principal surface among the plurality of battery cells.

This structure makes it possible to realize a high-performance battery. For example, it is possible to realize a battery that offers high uniformity in a current flowing inside the battery and great reliability.

Specifically, since the electrode insulation member covers the electrode layer at the first side surface of the power-generating element, it is possible to suppress the occurrence of short circuiting of the electrode layer and the counter electrode layer. Moreover, electrically connecting all of the battery cells in parallel makes it possible to suppress overcharge and overdischarge of a particular battery cell due to capacity variation among the battery cells. Thus, it is possible to enhance the reliability of the battery.

The counter electrode lead layer has a function of electrically connecting the plurality of battery cells in parallel. Since the counter electrode lead layer can be disposed tightly on the first side surface and the electrode insulation member, it is possible to make the volume of a portion pertaining to parallel connection small. Therefore, it is possible to enhance the energy density of the battery.

A current corresponding to all of the counter electrode layers of the plurality of battery cells flows at the first portion, of the counter electrode lead layer, connected to the counter electrode layer disposed closest to the counter electrode current collector terminal. On the other hand, a current corresponding to one counter electrode layer flows at the second portion connected to the counter electrode layer disposed farthest from the counter electrode current collector terminal. In the counter electrode lead layer, the resistance of the first portion is lower than the resistance of the second portion; therefore, the current flowing through the electric connection path for the counter electrode layers and the counter electrode current collector terminal is easier to flow at the first portion, at which the current corresponding to all of the counter electrode layers flows, than at the second portion, at which the current corresponding to one counter electrode layer flows. Therefore, it is possible to enhance the uniformity of the current flowing between each of the counter electrode layers and the counter electrode current collector terminal. This makes it easier to charge and discharge the counter electrode layers uniformly and thus makes it possible to suppress overcharge and overdischarge of a particular battery cell and, consequently, enhance the reliability of the battery.

The term "resistance" used herein means an electric resistance per unit length in a direction in which a current flows. The meaning of "the resistance of a portion is low" is not that electric resistivity that is unique to a material of which the portion is made is low but that a value obtained by dividing electric resistivity by a cross section orthogonal to a direction in which a current flows is small. For example, in a case where a portion is made of a plurality of materials, the resistance of the portion is calculated as a sum of values each obtained by dividing the corresponding electric resistivity by a cross section of each of the plurality of materials.

Additionally, for example, a thickness of the counter electrode lead layer at the first portion may be greater than a thickness of the counter electrode lead layer at the second portion.

Since this makes it possible to obtain an effect of making the resistance of the first portion lower and enhancing current uniformity just by adjusting the thickness of the counter electrode lead layer, the battery can be manufactured easily.

Additionally, for example, the first side surface is inclined with respect to a laminating direction of the power-generating element to configure an interior angle formed by the first side surface and the first principal surface as an obtuse angle.

According to this structure, the first side surface is inclined in such a way as to widen outward of the power-generating element as it goes away from the first principal surface in the laminating direction. Consequently, even in a case where the counter electrode lead layer is thicker at the first portion, which is closer to the counter electrode current collector terminal, than at the second portion, it is possible to approximate the angle of the external side surface of the counter electrode lead layer with respect to the first principal surface to a right angle. Therefore, for example, when the battery is mounted onto a substrate such that the counter electrode current collector terminal faces the substrate, it is less likely that a wasteful space will be formed, and the mountability of the battery onto the substrate improves.

Additionally, for example, a height of the counter electrode lead layer from the first side surface may increase toward the counter electrode current collector terminal in a laminating direction of the power-generating element.

According to this structure, the thickness of the counter electrode lead layer is greater, and the resistance is lower, at the portion, of the counter electrode lead layer, connected to the counter electrode layer disposed comparatively near the counter electrode current collector terminal. Therefore, it is possible to further enhance the uniformity of the current flowing between each of the counter electrode layers and the counter electrode current collector terminal.

Additionally, for example, the counter electrode lead layer may cover the first principal surface.

According to this structure, since the counter electrode lead layer is formed in a wrapping manner from the first side surface onto the first principal surface, the reliability of connection of the counter electrode lead layer enhances. For example, since the portion, of the counter electrode lead layer, covering the first principal surface is hooked on the power-generating element, the counter electrode lead layer does not come off easily even where an external stress is applied.

Additionally, for example, the counter electrode current collector terminal may be a current collector constituting the first principal surface, and a thickness of the counter electrode current collector terminal may be greater than a thickness of a current collector included in one of the plurality of battery cells.

This makes it possible to reduce the number of parts by using the counter electrode current collector as the counter electrode current collector terminal. Moreover, it is possible to easily achieve a low resistance of the counter electrode current collector terminal by making the thickness of the counter electrode current collector used as the counter electrode current collector terminal greater than the thickness of the other current collectors. As described above, in this specification, the meaning of "a current collector terminal is provided at a principal surface" includes not only a case where a member that is different from a member constituting a principal surface is disposed as a current collector terminal on the principal surface but also a case where the member constituting the principal surface itself is the current collector terminal.

Additionally, for example, the counter electrode lead layer may include a first conductive member being in contact with the counter electrode layer, and a second conductive member covering the first conductive member.

According to this structure, it is possible to form the counter electrode lead layer using a plurality of materials having different properties. For example, as a material used for the first conductive member that is in contact with the counter electrode layer, a material selection can be made with a focus on high conductivity, alloying with metal contained in the current collector, and the like. As a material used for the second conductive member, a material selection can be made with a focus on flexibility, shock resistance, chemical stability, cost, ease of expansion at the time of work, and the like. Since it is possible to select a material suited for each member, it is possible to improve battery performance and enhance the ease of battery manufacturing.

Additionally, for example, a conductivity of a material of which the first portion is made may be higher than a conductivity of a material of which the second portion is made.

This makes it possible to make the resistance of the first portion low without making the first portion thicker than the second portion of the counter electrode lead layer; therefore, it is possible to make the size of the battery smaller.

In a case where the material is made up of a plurality of materials, the conductivity is a volume-based average of conductivities of these materials.

Additionally, for example, the battery may further include: a counter electrode insulation member covering the counter electrode layer of each of the plurality of battery cells at a second side surface of the power-generating element; an electrode lead layer covering the second side surface and the counter electrode insulation member and electrically connected to the electrode layer of each of the plurality of battery cells; and an electrode current collector terminal provided at the first principal surface of the power-generating element and connected to the electrode lead layer, wherein a resistance of a third portion, of the electrode lead layer, connected to the electrode layer of the battery cell disposed closest to the first principal surface among the plurality of battery cells may be lower than a resistance of a fourth portion, of the electrode lead layer, connected to the electrode layer of the battery cell disposed farthest from the first principal surface among the plurality of battery cells.

This structure makes it possible to realize a more high-performance battery.

Specifically, since the counter electrode insulation member covers the counter electrode layer at the second side surface of the power-generating element and, since the electrode lead layer has a function of electrically connecting the plurality of battery cells in parallel, it is possible to enhance the reliability and energy density of the battery as done by the electrode insulation member and the counter electrode lead layer.

A current corresponding to all of the electrode layers of the plurality of battery cells flows at the third portion, of the electrode lead layer, connected to the electrode layer disposed closest to the electrode current collector terminal. On the other hand, a current corresponding to one electrode layer flows at the fourth portion connected to the electrode layer disposed farthest from the electrode current collector terminal. In the electrode lead layer, the resistance of the third portion is lower than the resistance of the fourth portion; therefore, the current flowing through the electric connection path for the electrode layers and the electrode current collector terminal is easier to flow at the third portion, at which the current corresponding to all of the electrode layers flows, than at the fourth portion, at which the current corresponding to one electrode layer flows. Therefore, it is possible to enhance the uniformity of the current flowing between each of the electrode layers and the electrode current collector terminal. This makes it easier to charge and discharge the electrode layers uniformly and thus makes it possible to suppress overcharge or overdischarge of a particular battery cell and, consequently, enhance the reliability of the battery.

Moreover, since the counter electrode current collector terminal and the electrode current collector terminal are provided on different principal surfaces respectively, for example, it is possible to form a large current collector terminal covering the most part of each of the principal surfaces. Since a low resistance of the current collector terminal is achieved, it is possible to enhance large-current characteristics.

Additionally, for example, a thickness of the electrode lead layer at the third portion may be greater than a thickness of the electrode lead layer at the fourth portion.

Since this makes it possible to obtain an effect of making the resistance of the third portion lower and enhancing current uniformity just by adjusting the thickness of the electrode lead layer, the battery can be manufactured easily.

Additionally, for example, the first side surface and the second side surface may be located opposite of each other, a cross-sectional shape of the power-generating element when cut in a laminating direction of the power-generating element at a position going through the first side surface and the second side surface may be a trapezoid, and each of an interior angle formed by the first side surface and the first principal surface and an interior angle formed by the second side surface and the first principal surface may be an obtuse angle.

Even in a case where the counter electrode lead layer is thicker at the first portion, which is closer to the counter electrode current collector terminal, than at the second portion and where the electrode lead layer is thicker at the third portion, which is closer to the electrode current collector terminal, than at the fourth portion, this makes it possible to approximate the shape of the battery as a whole to a rectangular parallelepiped. Therefore, for example, when the battery is mounted onto a substrate, it is less likely that a wasteful space will be formed, and the mountability of the battery onto the substrate improves.

Additionally, for example, the battery may further include: a counter electrode insulation member covering the counter electrode layer of each of the plurality of battery cells at a second side surface of the power-generating element; an electrode lead layer covering the second side surface and the counter electrode insulation member and electrically connected to the electrode layer of each of the plurality of battery cells; and an electrode current collector terminal provided at a second principal surface, the second principal surface being an opposite of the first principal surface of the power-generating element, and connected to the electrode lead layer, wherein a resistance of a third portion, of the electrode lead layer, connected to the electrode layer of a battery cell disposed closest to the second principal surface among the plurality of battery cells may be lower than a resistance of a fourth portion, of the electrode lead layer, connected to the electrode layer of a battery cell disposed farthest from the second principal surface among the plurality of battery cells.

This structure makes it possible to realize a more high-performance battery.

Specifically, since the counter electrode insulation member covers the counter electrode layer at the second side surface of the power-generating element and, since the electrode lead layer has a function of electrically connecting the plurality of battery cells in parallel, it is possible to enhance the reliability and energy density of the battery as done by the electrode insulation member and the counter electrode lead layer.

A current corresponding to all of the electrode layers of the plurality of battery cells flows at the third portion, of the electrode lead layer, connected to the electrode layer disposed closest to the electrode current collector terminal. On the other hand, a current corresponding to one electrode layer flows at the fourth portion connected to the electrode layer disposed farthest from the electrode current collector terminal. In the electrode lead layer, the resistance of the third portion is lower than the resistance of the fourth portion; therefore, the current flowing through the electric connection path for the electrode layers and the electrode current collector terminal is easier to flow at the third portion, at which the current corresponding to all of the electrode layers flows, than at the fourth portion, at which the current corresponding to one electrode layer flows. Therefore, it is possible to enhance the uniformity of the current flowing between each of the electrode layers and the electrode current collector terminal. This makes it easier to charge and discharge the electrode layers uniformly and thus makes it possible to suppress overcharge and overdischarge of a particular battery cell and, consequently, enhance the reliability of the battery.

Moreover, since the counter electrode current collector terminal and the electrode current collector terminal are provided at the same principal surface, the mounting of the battery is easier. Moreover, for example, since it is possible to adjust the shape and arrangement of the current collector terminals in accordance with the wiring layout of the mounting substrate, it is possible to enhance the degree of freedom in connection.

Furthermore, since both the positive terminal and the negative terminal are provided at the same principal surface, it is possible to achieve compact mounting of the battery. For example, it is possible to make the pattern of connection terminals formed on the mounting substrate (also called as "footprint") smaller. Furthermore, low-profile mounting onto the mounting substrate is realized because the mounting can be performed in a state in which the principal surface of the power-generating element and the mounting substrate are disposed parallel to each other.

Additionally, for example, a thickness of the electrode lead layer at the third portion may be greater than a thickness of the electrode lead layer at the fourth portion.

Since this makes it possible to obtain an effect of making the resistance of the third portion lower and enhancing current uniformity just by adjusting the thickness of the electrode lead layer, the battery can be manufactured easily.

Additionally, for example, the first side surface and the second side surface may be located opposite of each other, a cross-sectional shape of the power-generating element when cut in a laminating direction of the power-generating element at a position going through the first side surface and the second side surface may be a parallelogram, and each of an interior angle formed by the first side surface and the first principal surface and an interior angle formed by the second side surface and the second principal surface may be an obtuse angle.

Even in a case where the counter electrode lead layer is thicker at the first portion, which is closer to the counter electrode current collector terminal, than at the second portion and where the electrode lead layer is thicker at the third portion, which is closer to the electrode current collector terminal, than at the fourth portion, this makes it possible to approximate the shape of the battery as a whole to a rectangular parallelepiped. Therefore, for example, when the battery is mounted onto a substrate, it is less likely that a wasteful space will be formed, and the mountability of the battery onto the substrate improves.

Additionally, for example, the electrode current collector terminal may be a current collector constituting the second principal surface, and a thickness of the electrode current collector terminal may be greater than a thickness of a current collector included in one of the plurality of battery cells.

This makes it possible to reduce the number of parts by using the electrode current collector as the electrode current collector terminal. Moreover, it is possible to easily achieve a low resistance of the electrode current collector terminal by making the thickness of the electrode current collector used as the electrode current collector terminal greater than the thickness of the other current collectors.

Additionally, for example, a height of the electrode lead layer from the second side surface may increase toward the electrode current collector terminal in a laminating direction of the power-generating element.

According to this structure, the thickness of the electrode lead layer is greater, and the resistance is lower, at the portion, of the electrode lead layer, connected to the electrode layer disposed comparatively near the electrode current collector terminal. Therefore, it is possible to further enhance the uniformity of the current flowing between each of the electrode layers and the electrode current collector terminal.

Additionally, for example, the electrode insulation member may contain a resin.

This makes it possible to enhance the shock resistance of the battery. Moreover, it is possible to alleviate the stress applied to the battery due to a change in temperature of the battery or due to expansion/contraction at the time of charging and discharging.

Additionally, for example, the battery may further include: a sealing member exposing at least a part of the counter electrode current collector terminal and encapsulating the power-generating element and the counter electrode lead layer.

This makes it possible to protect the power-generating element from external air, moisture, and the like and therefore makes it possible to enhance the reliability of the battery.

A method for manufacturing a battery according to an aspect of the present disclosure includes: preparing a plurality of battery cells each including an electrode layer, a counter electrode layer, and a solid electrolyte layer located between the electrode layer and the counter electrode layer; forming a laminated body in which the plurality of battery cells are laminated one on top of another while alternating an order of arrangement of the electrode layer, the counter electrode layer, and the solid electrolyte layer from a battery cell to a battery cell; covering the electrode layer of each of the plurality of battery cells at a first side surface of the laminated body by an electrode insulation member; covering the first side surface and the electrode insulation member by a counter electrode lead layer electrically connected to the counter electrode layer of each of the plurality of battery cells; and providing a counter electrode current collector terminal connected to the counter electrode lead layer at a first principal surface of the laminated body, wherein in the covering by the counter electrode lead layer, the counter electrode lead layer is formed such that a resistance of a first portion, of the counter electrode lead layer, connected to the counter electrode layer of a battery cell disposed closest to the first principal surface among the plurality of battery cells is lower than a resistance of a second portion, of the counter electrode lead layer, connected to the counter electrode layer of a battery cell disposed farthest from the first principal surface among the plurality of battery cells.

This method makes it possible to manufacture the above-described high-performance battery.

Additionally, for example, in the covering by the counter electrode lead layer, the counter electrode lead layer may be formed to configure a thickness of the counter electrode lead layer at the first portion greater than a thickness of the counter electrode lead layer at the second portion.

Since this makes it possible to make the resistance of the first portion lower just by adjusting the thickness of the counter electrode lead layer, the battery can be manufactured easily.

Embodiments will be described in detail below with reference to the drawings.

It should be noted that every embodiment to be described below illustrates a comprehensive or specific example. Numerical values, shapes, materials, constituent elements, topologies and connections of constituent elements, steps, and orders of steps, etc. to be described in the following embodiments are just examples and are not intended to limit the present disclosure. Moreover, among the constituent elements in the following embodiments, those that are not recited in independent claims will be described as optional constituent elements.

It should be further noted that the drawings are schematic in nature and do not necessarily provide strict illustrations. Accordingly, for example, the drawings are not necessarily to scale. In the drawings, the same reference signs are assigned to substantially the same components, and duplicative description may be omitted, or the description may be simplified.

Terms such as "parallel" and "orthogonal" used herein to show a relationship between elements, terms such as "rectangular" and "rectangular parallelepiped" used herein to show a shape of an element, and ranges of numerical values used herein shall not be construed in their exact meanings only but shall be construed to encompass ranges of substantial equivalence, for example, with a margin of difference of several percent or so allowed.

In this specification and drawings, x, y, and z axes represent three axes of a three-dimensional orthogonal coordinate system. In a case where a power-generating element of a battery has a rectangular shape in a plan view, the x axis and the y axis correspond to a direction parallel to a first side of the rectangle and a direction parallel to a second side orthogonal to the first side, respectively. The z axis corresponds to a laminating direction of a plurality of battery cells included in the power-generating element.

The term "laminating direction" used herein corresponds to a direction normal to principal surfaces of a current collector and an active material layer. The term "plan view" used herein means a view taken in a direction perpendicular to a principal surface of the power-generating element unless otherwise specified, for example, when used alone. When this term is used for specifying "a plan view of a certain surface" as in "a plan view of a first side surface" or the like, it means a view of the "certain surface" as seen from the front.

The terms "above" and "below" used herein do not refer to an upward direction (upward in a vertical direction) and a downward direction (downward in a vertical direction) in absolute space recognition but are used as terms defined by a relative positional relationship on the basis of an order of laminating in a laminating configuration. The terms "above" and "below" apply not only in a case where two constituent elements are disposed apart from each other, with another constituent element interposed between the two constituent elements, but also in a case where two constituent elements are in contact with each other by being disposed tightly on each other. In the description below, the negative side of the z axis will be referred to as "below" or "lower", and the positive side of the z axis will be referred to as "above" or "upper".

The phrase "covers A" used herein means covering at least a part of "A". That is, the meaning of the phrase "covers A" includes not only "covers the whole of A" but also "covers a part of A", where "A" is, for example, a side surface, a principal surface, etc. of a predetermined member such as a layer or a terminal.

Ordinal numerals such as "first" and "second" used herein do not mean the number or sequence of constituent elements but are used for the purpose of avoiding a mix-up between constituent elements of the same kind and distinguishing the constituent elements from each other, unless otherwise specified.

First Embodiment

A structure of a battery according to a first embodiment will now be described.

FIG. 1 is a cross-sectional view of a battery 1 according to the present embodiment. As illustrated in FIG. 1, the battery 1 includes a power-generating element 10, an electrode insulation layer 21, a counter electrode insulation layer 22, a counter electrode lead layer 31, an electrode lead layer 32, a counter electrode current collector terminal 41, an electrode current collector terminal 42, a counter electrode intermediate layer 51, and an electrode intermediate layer 52. The battery 1 is, for example, an all-solid-state battery.

1. Power-Generating Element

Figure 2A:
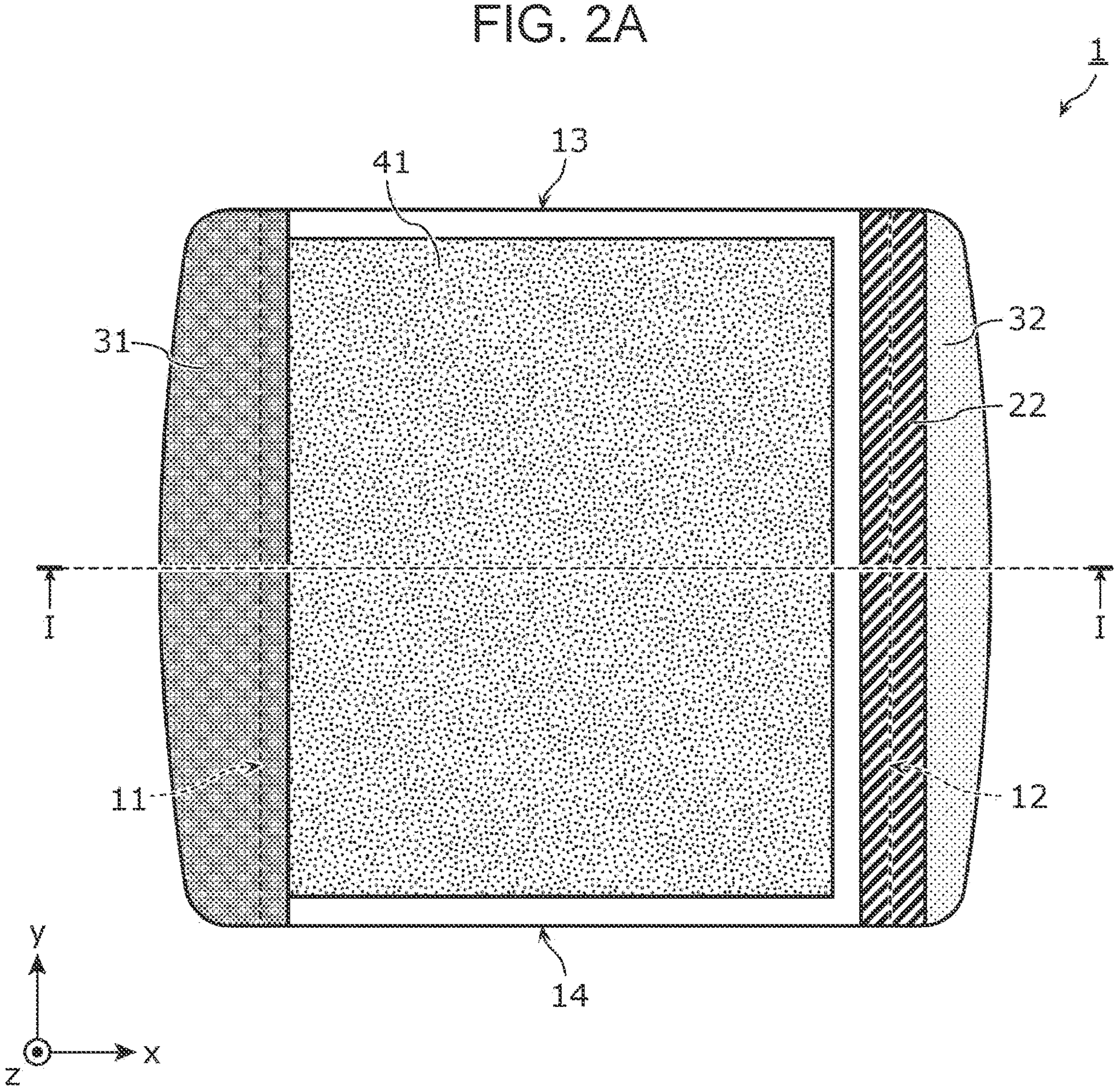
FIG. 2A is a top view of the battery according to the first embodiment.
Figure 2B:
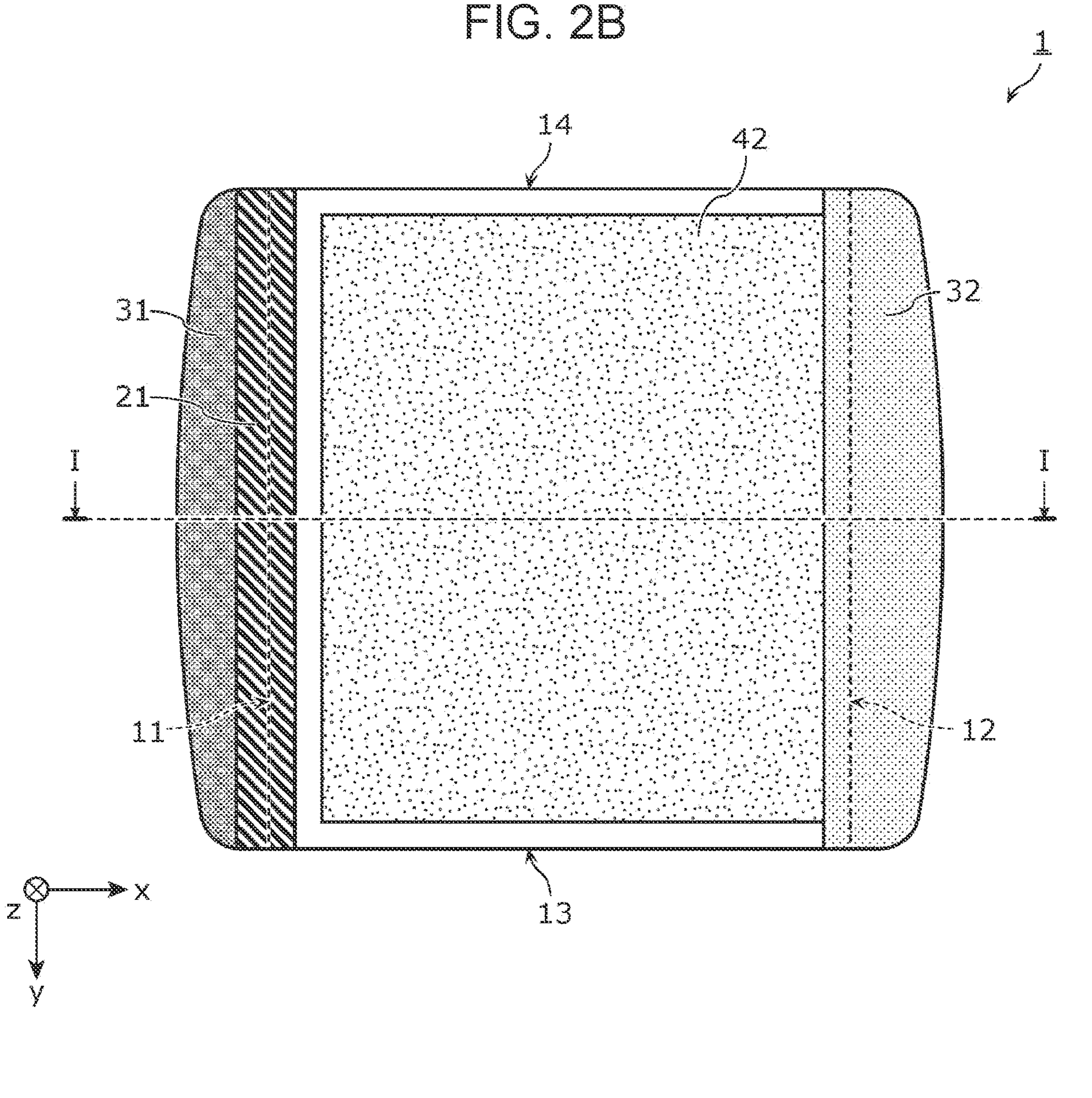
FIG. 2B is a bottom view of the battery according to the first embodiment.

First, a specific structure of the power-generating element 10 will now be described with reference to FIGS. 1, 2A, and 2B. FIG. 2A is a top view of the battery 1 according to the present embodiment. FIG. 2B is a bottom view of the battery 1 according to the present embodiment. FIG. 1 illustrates a cross section taken along the line I-I of FIGS. 2A and 2B.

The shape of the power-generating element 10 in a plan view is, for example, a rectangle as illustrated in FIGS. 2A and 2B. That is, the shape of the power-generating element 10 is a low-profile rectangular parallelepiped. The term "low-profile" means that the thickness (that is, the length in the z-axis direction) is less than each side (that is, the length in each of the x-axis direction and the y-axis direction) of the principal surface or the maximum width. The shape of the power-generating element 10 in a plan view may be any other polygonal shape such as a square, a hexagon, or an octagon, or may be a circle, an ellipse, or the like. Though the power-generating element 10 has a low-profile shape actually as described above, in cross-sectional views such as FIG. 1, the thickness of each layer is illustrated in an exaggerated manner so as to make it easier to understand the layer structure of the power-generating element 10.

As illustrated in FIGS. 1, 2A, and 2B, the power-generating element 10 includes four side surfaces 11, 12, 13, and 14 and two principal surfaces 15 and 16. In the present embodiment, the side surfaces 11, 12, 13, and 14 and the principal surfaces 15 and 16 are flat surfaces.

The side surface 11 is an example of a first side surface. The side surface 12 is an example of a second side surface. The side surfaces 11 and 12 are located opposite of each other and are parallel to each other. The side surfaces 13 and 14 are located opposite of each other and are parallel to each other. The side surfaces 11, 12, 13, and 14 are, for example, cut surfaces formed by cutting a laminated body comprised of a plurality of battery cells 100 together. In addition, the side surfaces 11, 12, 13, and 14 extend perpendicularly from the respective sides of the principal surfaces 15 and 16 with respect to the principal surfaces 15 and 16. The side surfaces 11, 12, 13, and 14 are parallel to the laminating direction. The side surfaces 11, 12, 13, and 14 are formed by cutting the laminated body comprised of the plurality of battery cells 100 together in the laminating direction at the time of cutting. Therefore, it is possible to simplify the cutting process. Moreover, since each layer area of the battery cells 100 is determined accurately through the cutting, it is possible to decrease capacity variation of the battery 1 and increase precision in battery capacity.

The principal surface 15 is an example of a first principal surface. The principal surface 16 is an example of a second principal surface. The principal surfaces 15 and 16 are located opposite of each other and are parallel to each other. The principal surface 15 is the top surface of the power-generating element 10. The principal surface 16 is the bottom surface of the power-generating element 10. Each of the principal surfaces 15 and 16 is larger in area than each of the side surfaces 11, 12, 13, and 14.

Moreover, as illustrated in FIG. 1, the cross-sectional shape of the power-generating element 10 when cut in the laminating direction at a position going through the side surfaces 11 and 12 is a rectangle.

As illustrated in FIG. 1, the power-generating element 10 includes the plurality of battery cells 100. The battery cell 100 is, for example, a battery of a minimum structure and is called also as a unit cell. The plural battery cells 100 are electrically connected in parallel and are laminated. In the present embodiment, all of the battery cells 100 of the power-generating element 10 are electrically connected in parallel. In the example illustrated in FIG. 1, the number of the battery cells 100 of the power-generating element 10 is seven, but is not limited thereto. For example, the number of the battery cells 100 of the power-generating element 10 may be an even number such as two or four, or an odd number such as three or five.

Each of the plurality of battery cells 100 includes an electrode layer 110, a counter electrode layer 120, and a solid electrolyte layer 130. The electrode layer 110 includes an electrode current collector 111 and an electrode active material layer 112. The counter electrode layer 120 includes a counter electrode current collector 121 and a counter electrode active material layer 122. In each of the plurality of battery cells 100, the electrode current collector 111, the electrode active material layer 112, the solid electrolyte layer 130, the counter electrode active material layer 122, and the counter electrode current collector 121 are laminated along the z axis in this order.

The electrode layer 110 is one of a positive layer and a negative layer of the battery cell 100. The counter electrode layer 120 is the other of the positive layer and the negative layer of the battery cell 100. In the description below, a case where the electrode layer 110 is the negative layer, and the counter electrode layer 120 is the positive layer, is taken as an example.

The plurality of battery cells 100 has substantially the same structure. In two battery cells 100 disposed adjacent to each other, the orders of arrangement of the layers that make up the battery cell 100 each are the opposite of each other. That is, the plural battery cells 100 are laminated in layers along the z axis with alternation between the orders of arrangement of the layers that make up the battery cell 100 each. In the present embodiment, since the number of the battery cells 100 is an odd number, the respective current collectors of the lowermost layer and the uppermost layer of the power-generating element 10 are of different polarities.

Figure 3A:
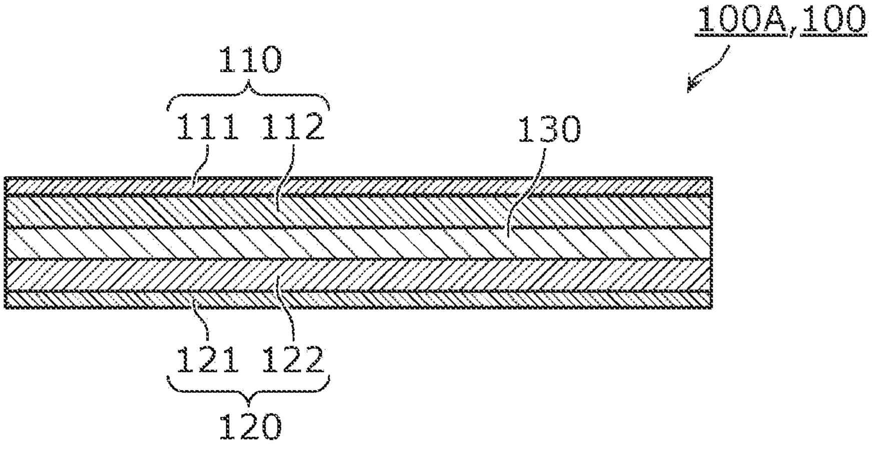
FIG. 3A is a cross-sectional view of an example of a battery cell included in a power-generating element according to the first embodiment.

With reference to FIG. 3A, each layer of the battery cell 100 will now be described. FIG. 3A is a cross-sectional view of the battery cell 100 included in the power-generating element 10 according to the present embodiment.

Each of the electrode current collector 111 and the counter electrode current collector 121 is a foil-like, plate-like, or mesh-like member having conductivity. For example, each of the electrode current collector 111 and the counter electrode current collector 121 may be a thin film having conductivity. As the material of the electrode current collector 111 and the counter electrode current collector 121, for example, metal such as stainless (SUS), aluminum (Al), copper (Cu), nickel (Ni), etc. can be used. The electrode current collector 111 and the counter electrode current collector 121 may be made of different materials.

The thickness of each of the electrode current collector 111 and the counter electrode current collector 121 is, for example, 5 μm or greater and 100 μm or less, but is not limited thereto. The electrode active material layer 112 is in contact with a principal surface of the electrode current collector 111. The electrode current collector 111 may include a current collector layer that is a layer containing a conductive material and provided at a portion of contact with the electrode active material layer 112. The counter electrode active material layer 122 is in contact with a principal surface of the counter electrode current collector 121. The counter electrode current collector 121 may include a current collector layer that is a layer containing a conductive material and provided at a portion of contact with the counter electrode active material layer 122.

The electrode active material layer 112 is disposed on the counter-electrode-layer-(120)-side principal surface of the electrode current collector 111. The electrode active material layer 112 contains, for example, a negative electrode active material as an electrode material. The electrode active material layer 112 is disposed in such a way as to be opposed to the counter electrode active material layer 122.

A negative electrode active material such as, for example, graphite or metallic lithium can be used as the negative electrode active material contained in the electrode active material layer 112. Various kinds of material capable of desorbing and adsorbing ions such as lithium (Li) or magnesium (Mg) can be used as the negative electrode active material.

A solid electrolyte such as, for example, an inorganic solid electrolyte may be used as a material contained in the electrode active material layer 112. For example, a sulfide solid electrolyte or an oxide solid electrolyte can be used as the inorganic solid electrolyte. For example, a mixture of lithium sulfide ($Li_2S$) and diphosphorus pentasulfide ($P_2S_5$) can be used as the sulfide solid electrolyte. A conductive material such as, for example, acetylene black, or a binder such as, for example, polyvinylidene fluoride may be used as a material contained in the electrode active material layer 112.

The electrode active material layer 112 is produced by applying a paste-like coating containing a solvent and the material of the electrode active material layer 112 mixed therewith onto a principal surface of the electrode current collector 111 and then drying the paste. For the purpose of increasing the density of the electrode active material layer 112, the electrode layer 110 (referred to also as an electrode plate) including the electrode active material layer 112 and the electrode current collector 111 may be pressed after the drying. The thickness of the electrode active material layer 112 is, for example, 5 μm or greater and 300 μm or less, but is not limited thereto.

The counter electrode active material layer 122 is disposed on the electrode-layer-(110)-side principal surface of the counter electrode current collector 121. The counter electrode active material layer 122 is, for example, a layer containing a positive electrode material such as an active material. The positive electrode material is a material forming a counter electrode against an electrode made of a negative electrode material. For example, the counter electrode active material layer 122 contains a positive electrode active material.

A positive electrode active material such as, for example, a lithium cobalt oxide complex oxide (LCO), a lithium nickel oxide complex oxide (LNO), a lithium manganese oxide complex oxide (LMO), a lithium-manganese-nickel complex oxide (LMNO), a lithium-manganese-cobalt complex oxide (LMCO), a lithium-nickel-cobalt complex oxide (LNCO), a lithium-nickel-manganese-cobalt complex oxide (LNMCO) can be used as the positive electrode active material contained in the counter electrode active material layer 122. Various kinds of material capable of desorbing and adsorbing ions such as Li or Mg can be used as the positive electrode active material.

A solid electrolyte such as, for example, an inorganic solid electrolyte may be used as a material contained in the counter electrode active material layer 122. A sulfide solid electrolyte or an oxide solid electrolyte can be used as the inorganic solid electrolyte. For example, a mixture of $Li_2S$ and $P_2S_5$ can be used as the sulfide solid electrolyte. The surface of the positive electrode active material may be coated with a solid electrolyte. A conductive material such as, for example, acetylene black, or a binder such as, for example, polyvinylidene fluoride may be used as a material contained in the counter electrode active material layer 122.

The counter electrode active material layer 122 is produced by applying a paste-like coating containing a solvent and the material of the counter electrode active material layer 122 mixed therewith onto a principal surface of the counter electrode current collector 121 and then drying the paste. For the purpose of increasing the density of the counter electrode active material layer 122, the counter electrode layer 120 (referred to also as a counter electrode plate) including the counter electrode active material layer 122 and the counter electrode current collector 121 may be pressed after the drying. The thickness of the counter electrode active material layer 122 is, for example, 5 μm or greater and 300 μm or less, but is not limited thereto.

The solid electrolyte layer 130 is disposed between the electrode active material layer 112 and the counter electrode active material layer 122. The solid electrolyte layer 130 is in contact with the electrode active material layer 112 and with the counter electrode active material layer 122. The solid electrolyte layer 130 is a layer containing an electrolyte material. Electrolytes for batteries that are generally known can be used as the electrolyte material. The thickness of the solid electrolyte layer 130 may be 5 μm or greater and 300 μm or less, or 5 μm or greater and 100 μm or less.

The solid electrolyte layer 130 contains a solid electrolyte. A solid electrolyte such as, for example, an inorganic solid electrolyte is used as the solid electrolyte. A sulfide solid electrolyte or an oxide solid electrolyte can be used as the inorganic solid electrolyte. For example, a mixture of $Li_2S$ and $P_2S_5$ can be used as the sulfide solid electrolyte. The solid electrolyte layer 130 may contain a binder such as, for example, polyvinylidene fluoride in addition to the electrolyte material.

In the present embodiment, the electrode active material layer 112, the counter electrode active material layer 122, and the solid electrolyte layer 130 are kept in a parallel flat plate shape. This makes it possible to suppress the occurrence or cracking or collapsing due to warping. The electrode active material layer 112, the counter electrode active material layer 122, and the solid electrolyte layer 130 may be curved together smoothly.

In the present embodiment, the side-surface-(11)-side end face of the counter electrode layer 120 is in alignment with the side-surface-(11)-side end face of the electrode layer 110 when viewed in the direction in which the layers of the battery cell 100 are arranged and in which the side surface 11 extends, that is, in the present embodiment, when viewed in the z-axis direction. Specifically, the side-surface-(11)-side end face of the counter electrode current collector 121 is in alignment with the side-surface-(11)-side end face of the electrode current collector 111 when viewed in the direction in which the layers of the battery cell 100 are arranged and in which the side surface 11 extends. The same holds true for the side-surface-(12)-side end face of each of the counter electrode current collector 121 and the electrode current collector 111.

More specifically, in the battery cell 100, the electrode current collector 111, the electrode active material layer 112, the solid electrolyte layer 130, the counter electrode active material layer 122, and the counter electrode current collector 121 have the same shape and the same size with a matching contour. That is, the shape of the battery cell 100 is a low-profile rectangular-parallelepiped flat plate shape. The counter electrode current collector 121 may protrude at the side surface 11 beyond the end face of the electrode active material layer 112, the solid electrolyte layer 130, and the counter electrode active material layer 122. The counter electrode active material layer 122 may be retracted from the counter electrode current collector 121 at the side surface 11. Similarly, the electrode current collector 111 may protrude at the side surface 12 beyond the end face of the electrode active material layer 112, the solid electrolyte layer 130, and the counter electrode active material layer 122. The electrode active material layer 112 may be retracted from the electrode current collector 111 at the side surface 12. Since the side surface of the current collector is exposed in this structure, it is possible to increase the area of contact of the current collector and the lead layer. This structure can be formed by processing an end portion of the battery cell 100 using, for example, partial cutting, polishing, sandblasting, brushing, etching, plasma irradiation, or the like.

As illustrated in FIG. 1, in the present embodiment, a current collector is shared by two battery cells 100 disposed adjacent to each other. For example, the battery cell 100 of the lowermost layer and the battery cell 100 that is the one disposed immediately thereon share one electrode current collector 111.

Specifically, as illustrated in FIG. 1, in the plurality of battery cells 100, two electrode layers 110 disposed adjacent to each other share their electrode current collector 111. The electrode active material layers 112 are provided on the two respective principal surfaces of this shared electrode current collector 111. In addition, two counter electrode layers 120 disposed adjacent to each other share their counter electrode current collector 121. The counter electrode active material layers 122 are provided on the two respective principal surfaces of this shared counter electrode current collector 121.

Figure 3B:
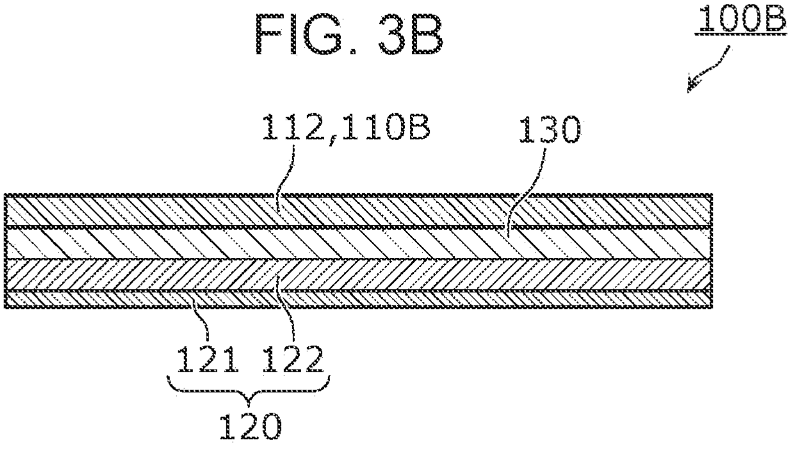
FIG. 3B is a cross-sectional view of another example of a battery cell included in the power-generating element according to the first embodiment.
Figure 3C:
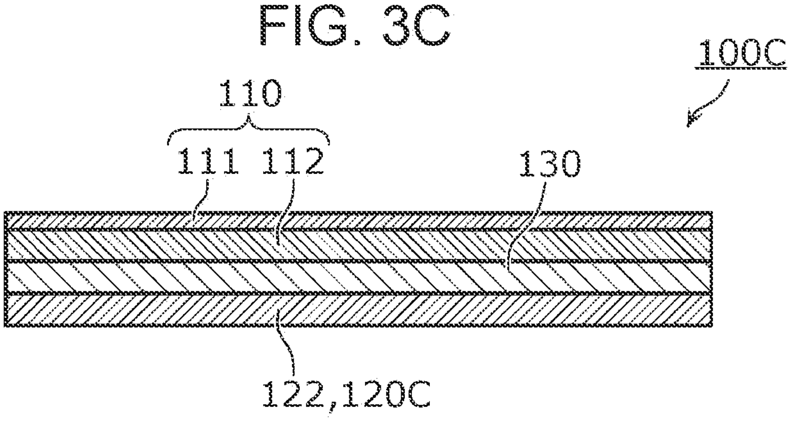
FIG. 3C is a cross-sectional view of another example of a battery cell included in the power-generating element according to the first embodiment.

The battery 1 described above is formed by laminating not only the battery cell 100 illustrated in FIG. 3A but also the battery cell(s) 100B illustrated in FIG. 3B and the battery cell(s) 100C illustrated in FIG. 3C in a combined manner. The battery cell 100 illustrated in FIG. 3A will be described as the battery cell 100A here.

The battery cell 100B illustrated in FIG. 3B has a structure of the battery cell 100A illustrated in FIG. 3A excluding the electrode current collector 111. That is, the electrode active material layer 112 is the sole constituent of the electrode layer 110B of the battery cell 100B.

The battery cell 100C illustrated in FIG. 3C has a structure of the battery cell 100A illustrated in FIG. 3A excluding the counter electrode current collector 121. That is, the counter electrode active material layer 122 is the sole constituent of the counter electrode layer 120C of the battery cell 100C.

Figure 4:
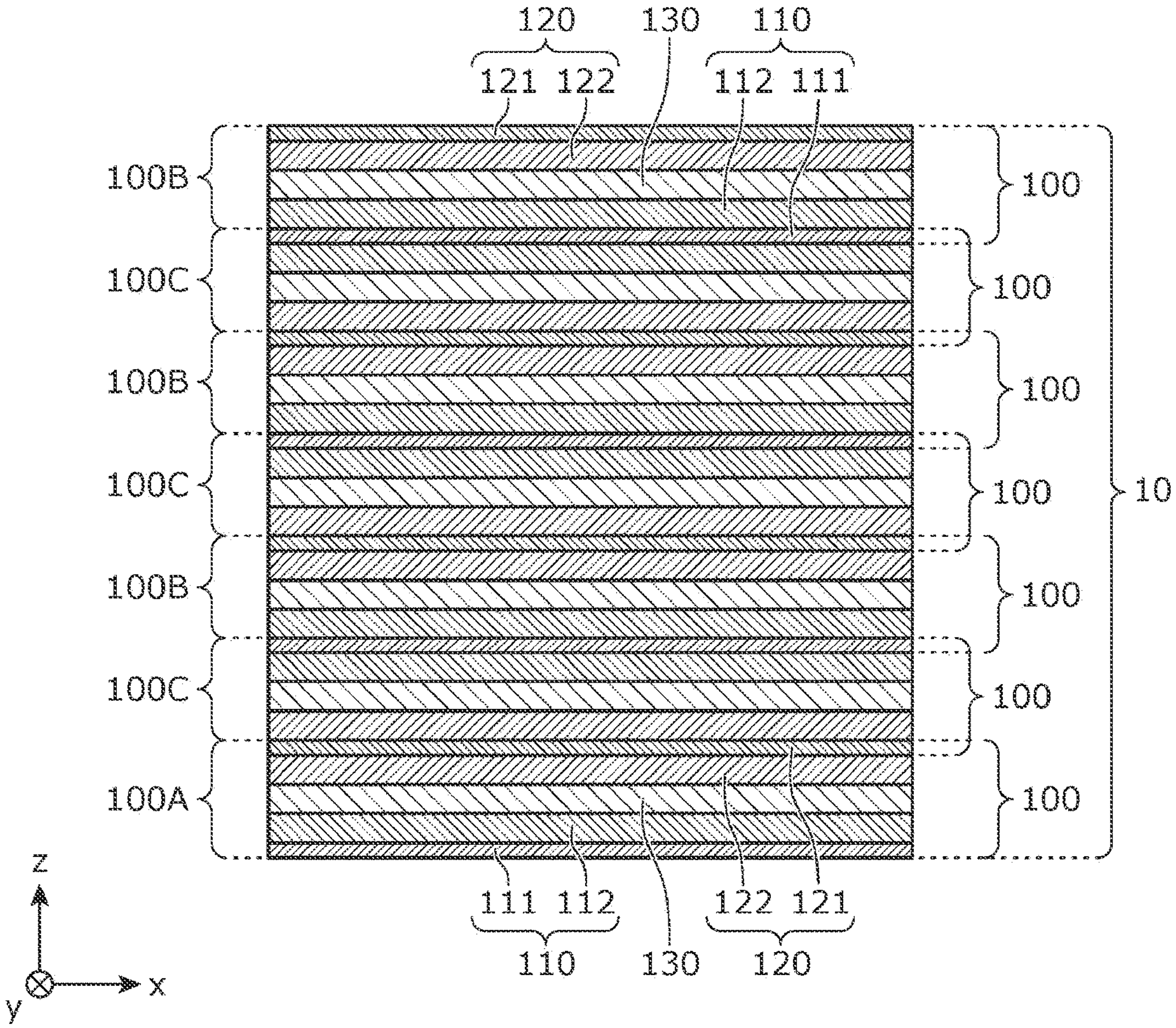
FIG. 4 is a cross-sectional view of the power-generating element according to the first embodiment.

FIG. 4 is a cross-sectional view of the power-generating element 10 according to the present embodiment. In FIG. 4, the power-generating element 10 only of FIG. 1 is illustrated in an excerpt view. As illustrated in FIG. 4, the battery cell 100A is disposed at the lowermost layer, and the battery cells 100B and the battery cells 100C are laminated upward thereon alternately. The battery cell 100A and the battery cells 100B are laminated each in upside-down orientation that is the opposite of FIG. 3A or FIG. 3B. By this means, the power-generating element 10 is formed.

The method for forming the power-generating element 10 is not limited to this example. For example, the battery cell 100A may be disposed at the uppermost layer. Alternatively, the battery cell 100A may be disposed at a position that is not at the uppermost layer nor at the lowermost layer. A plurality of battery cells 100A may be used. By performing double-sided paste application onto one current collector, units each made up of two battery cells 100 sharing the current collector may be formed, and then the units formed in this way may be laminated.

As described above, in the power-generating element 10 according to the present embodiment, all of the battery cells 100 are connected in parallel, and no serially connected battery cell is included. For this reason, at the time of charging and discharging of the battery 1, non-uniformity in a charging/discharging state caused due to capacity variation among the battery cells 100 is less likely to occur. Therefore, it is possible to significantly reduce the risk of overcharge and overdischarge of a part of the plurality of battery cells 100 and enhance the reliability of the battery 1.

2. Insulation Layer

Next, the electrode insulation layer 21 and the counter electrode insulation layer 22 will now be described.

The electrode insulation layer 21 is an example of an electrode insulation member and covers the electrode layer 110 at the side surface 11 as illustrated in FIG. 1. Specifically, the electrode insulation layer 21 covers the electrode current collector 111 and the electrode active material layer 112 completely at the side surface 11.

Figure 5:
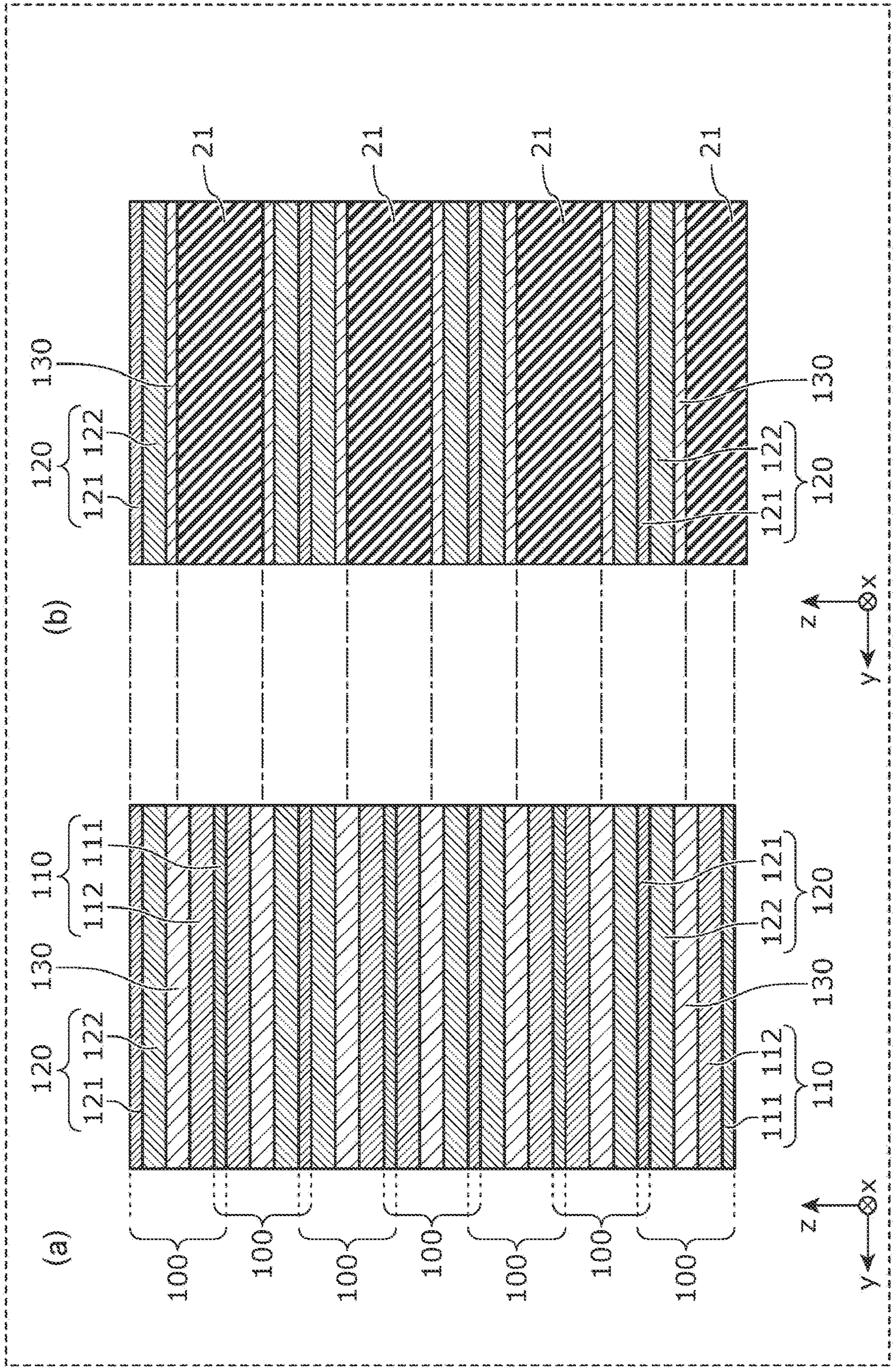
FIG. 5 is a side view illustrating a positional relationship between a first side surface of the power-generating element according to the first embodiment and an electrode insulation layer provided on the first side surface.

FIG. 5 is a side view illustrating a positional relationship between the side surface 11 of the power-generating element 10 according to the present embodiment and the electrode insulation layer 21 provided on the side surface 11. It should be noted that, in FIG. 5, the end face of each layer exposed at the side surface 11 is illustrated by means of the same hatching as that of the corresponding layer illustrated in the cross-sectional view of FIG. 1. The same holds true for FIG. 6 to be described later.

In FIG. 5, (*a*) is a side view of the power-generating element 10, where the side surface 11 is viewed in plan from the front. In FIG. 5, (*b*) is a view of the side surface 11 illustrated in (*a*) of FIG. 5 and the electrode insulation layer 21 provided on the side surface 11. That is, (*b*) of FIG. 5 is a side view of the battery 1 illustrated in FIG. 1 as seen from the negative side of the x axis, with the counter electrode lead layer 31 seen through.

As illustrated in (*b*) of FIG. 5, the electrode insulation layer 21 covers the electrode layer 110 of each of the plurality of battery cells 100 at the side surface 11. The electrode insulation layer 21 does not cover at least a part of the counter electrode layer 120 of each of the plurality of battery cells 100. For example, the electrode insulation layer 21 does not cover the counter electrode current collector 121. Therefore, the electrode insulation layer 21 has a stripe shape in a plan view of the side surface 11.

The electrode insulation layer 21 continuously covers the electrode layers 110 of two battery cells 100 disposed adjacent to each other. Specifically, the electrode insulation layer 21 provides a continuous cover from at least a part of the solid electrolyte layer 130 of one of the two battery cells 100 disposed adjacent to each other to at least a part of the solid electrolyte layer 130 of the other of the two battery cells 100 disposed adjacent to each other.

As described above, the electrode insulation layer 21 covers at least a part of the solid electrolyte layer 130 at the side surface 11. Specifically, when the side surface 11 is viewed in plan, the contour of the electrode insulation layer 21 lies on the solid electrolyte layer 130. This reduces the risk of exposure of the electrode layer 110 even when the width (the length in the z-axis direction) of the electrode insulation layer 21 deviates due to manufacturing variation. For this reason, it is possible to suppress short circuiting of the electrode layer 110 and the counter electrode layer 120 via the counter electrode lead layer 31, which is formed in such a way as to cover the electrode insulation layer 21. In addition, there exist very fine asperities in the end face of the solid electrolyte layer 130 made of a powdery material. For this reason, the electrode insulation layer 21 enters the asperities, and this increases the adhesion strength of the electrode insulation layer 21 and improves insulation reliability.

In the present embodiment, the electrode insulation layer 21 may cover the whole of the solid electrolyte layer 130 at the side surface 11. Specifically, the contour of the electrode insulation layer 21 may lie on the boundary between the solid electrolyte layer 130 and the counter electrode active material layer 122. It should be noted that covering a part of the solid electrolyte layer 130 by the electrode insulation layer 21 is not indispensable. For example, the contour of the electrode insulation layer 21 may lie on the boundary between the solid electrolyte layer 130 and the electrode active material layer 112. The electrode insulation layer 21 may cover not only the electrode layer 110 but also the whole of the solid electrolyte layer 130 and a part of the counter electrode layer 120 at the side surface 11. That is, the electrode insulation layer 21 may provide a cover from the electrode layer 110 to a part of the counter electrode layer 120, for example, at least a part of the counter electrode active material layer 122.

The electrode insulation layer 21 is provided in a split manner individually for each electrode layer 110 in (*b*) of FIG. 5; however, this does not imply any limitation. For example, in addition to having the stripe-shaped portion, the electrode insulation layer 21 may be provided along the z axis at y-directional ends of the side surface 11. That is, the electrode insulation layer 21 may have a ladder shape in a plan view of the side surface 11. As described here, the electrode insulation layer 21 may cover a part of the counter electrode current collector 121.

In the power-generating element 10 according to the present embodiment, the lowermost layer is the electrode current collector 111. As illustrated in FIG. 1 and (*b*) of FIG. 5, in the neighborhood of the lower end of the side surface 11, the electrode insulation layer 21 covers a part of the principal surface (i.e., the principal surface 16) of the electrode current collector 111 located at the lowermost layer. Because of this structure, the electrode insulation layer 21 is resistant to external stress, etc. applied in the z-axis direction, which suppresses its coming off. Moreover, even when the counter electrode lead layer 31 is formed in a wrapping manner partially on the principal surface 16 of the power-generating element 10, it is possible to avoid the occurrence of short circuiting due to contact with the electrode current collector 111. Thus, it is possible to enhance the reliability of the battery 1.

The counter electrode insulation layer 22 is an example of a counter electrode insulation member and covers the counter electrode layer 120 at the side surface 12 as illustrated in FIG. 1. Specifically, the counter electrode insulation layer 22 covers the counter electrode current collector 121 and the counter electrode active material layer 122 completely at the side surface 12.

Figure 6:
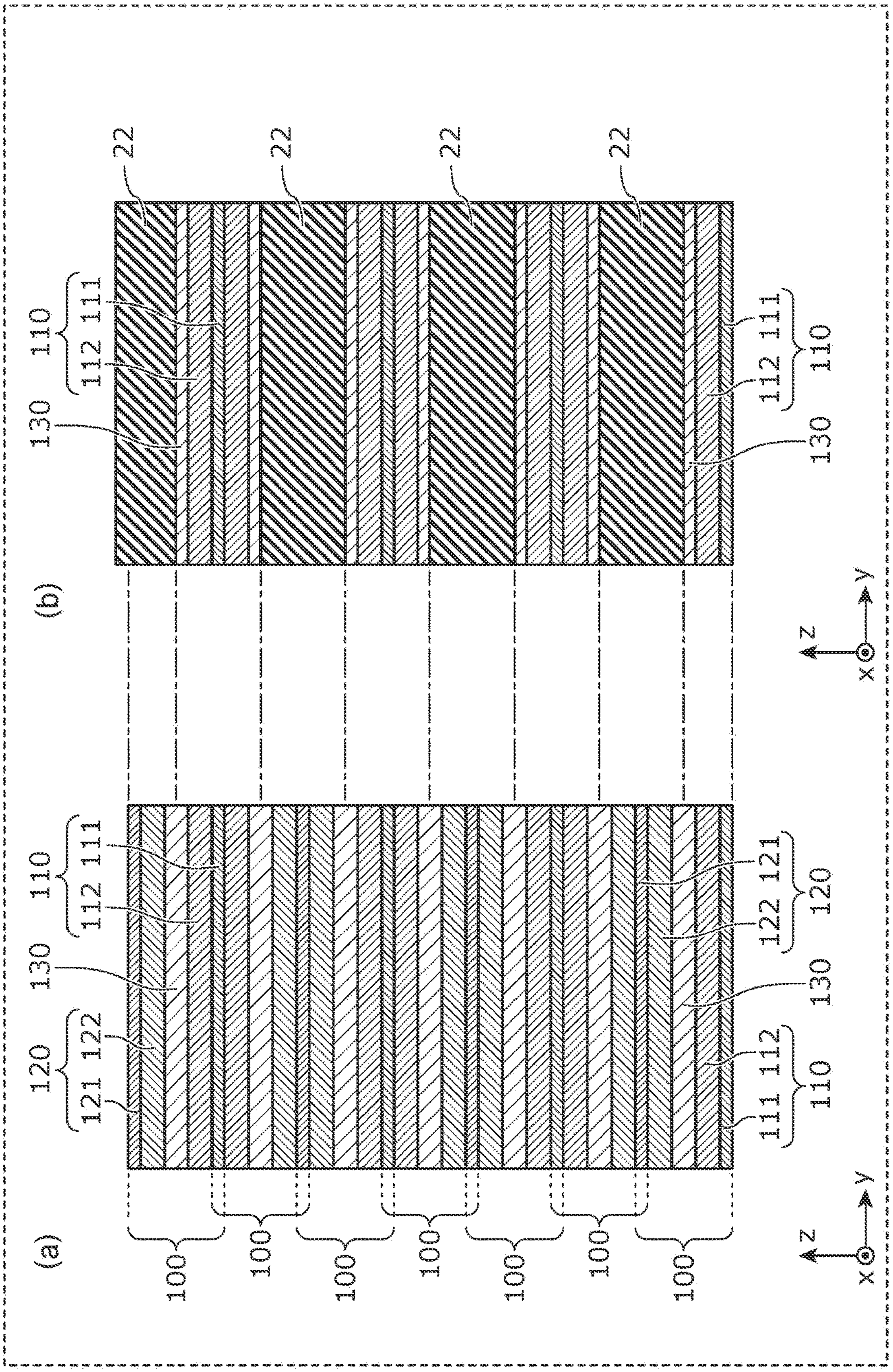
FIG. 6 is a side view illustrating a positional relationship between a second side surface of the power-generating element according to the first embodiment and a counter electrode insulation layer provided on the second side surface.

FIG. 6 is a side view illustrating a positional relationship between the side surface 12 of the power-generating element 10 according to the present embodiment and the counter electrode insulation layer 22 provided on the side surface 12. In FIG. 6, (*a*) is a side view of the power-generating element 10, where the side surface 12 is viewed in plan from the front. In FIG. 6, (*b*) is a view of the side surface 12 illustrated in (*a*) of FIG. 6 and the counter electrode insulation layer 22 provided on the side surface 12. That is, (*b*) of FIG. 6 is a side view of the battery 1 illustrated in FIG. 1 as seen from the positive side of the x axis, with the electrode lead layer 32 seen through.

As illustrated in (*b*) of FIG. 6, the counter electrode insulation layer 22 covers the counter electrode layer 120 of each of the plurality of battery cells 100 at the side surface 12. The counter electrode insulation layer 22 does not cover at least a part of the electrode layer 110 of each of the plurality of battery cells 100. For example, the counter electrode insulation layer 22 does not cover the electrode current collector 111. Therefore, the counter electrode insulation layer 22 has a stripe shape in a plan view of the side surface 12.

The counter electrode insulation layer 22 continuously covers the counter electrode layers 120 of two battery cells 100 disposed adjacent to each other. Specifically, the counter electrode insulation layer 22 provides a continuous cover from at least a part of the solid electrolyte layer 130 of one of the two battery cells 100 disposed adjacent to each other to at least a part of the solid electrolyte layer 130 of the other of the two battery cells 100 disposed adjacent to each other.

As described above, the counter electrode insulation layer 22 covers at least a part of the solid electrolyte layer 130 at the side surface 12. Specifically, when the side surface 12 is viewed in plan, the contour of the counter electrode insulation layer 22 lies on the solid electrolyte layer 130. This reduces the risk of exposure of the counter electrode layer 120 even when the width (the length in the z-axis direction) of the counter electrode insulation layer 22 deviates due to manufacturing variation. For this reason, it is possible to suppress short circuiting of the counter electrode layer 120 and the electrode layer 110 via the electrode lead layer 32, which is formed in such a way as to cover the counter electrode insulation layer 22. Moreover, the counter electrode insulation layer 22 enters the asperities in the end face of the solid electrolyte layer 130, and this increases the adhesion strength of the counter electrode insulation layer 22 and improves insulation reliability.

In the present embodiment, the counter electrode insulation layer 22 may cover the whole of the solid electrolyte layer 130 at the side surface 12. Specifically, the contour of the counter electrode insulation layer 22 may lie on the boundary between the solid electrolyte layer 130 and the electrode active material layer 112. It should be noted that covering a part of the solid electrolyte layer 130 by the counter electrode insulation layer 22 is not indispensable. For example, the contour of the counter electrode insulation layer 22 may lie on the boundary between the solid electrolyte layer 130 and the counter electrode active material layer 122. The counter electrode insulation layer 22 may cover not only the counter electrode layer 120 but also the whole of the solid electrolyte layer 130 and a part of the electrode layer 110 at the side surface 12. That is, the counter electrode insulation layer 22 may provide a cover from the counter electrode layer 120 to a part of the electrode layer 110, for example, at least a part of the electrode active material layer 112.

The counter electrode insulation layer 22 is provided in a split manner individually for each counter electrode layer 120 in (*b*) of FIG. 6; however, this does not imply any limitation. For example, in addition to having the stripe-shaped portion, the counter electrode insulation layer 22 may be provided along the z axis at y-directional ends of the side surface 12. That is, the counter electrode insulation layer 22 may have a ladder shape in a plan view of the side surface 12. As described here, the counter electrode insulation layer 22 may cover a part of the electrode current collector 111.

In the power-generating element 10 according to the present embodiment, the uppermost layer is the counter electrode current collector 121. As illustrated in FIG. 1 and (*b*) of FIG. 6, in the neighborhood of the upper end of the side surface 12, the counter electrode insulation layer 22 covers a part of the principal surface (i.e., the principal surface 15) of the counter electrode current collector 121 located at the uppermost layer. Because of this structure, the counter electrode insulation layer 22 is resistant to external stress, etc. applied in the z-axis direction, which suppresses its coming off. Moreover, even when the electrode lead layer 32 is formed in a wrapping manner partially on the principal surface 15 of the power-generating element 10, it is possible to avoid the occurrence of short circuiting due to contact with the counter electrode current collector 121. Thus, it is possible to enhance the reliability of the battery 1.

Each of the electrode insulation layer 21 and the counter electrode insulation layer 22 is formed using an insulation material having electrical insulation properties. For example, each of the electrode insulation layer 21 and the counter electrode insulation layer 22 contains a resin. The resin is, for example, an epoxy-based resin, but is not limited thereto. An inorganic material may be used as the insulation material. The insulation material that can be used is selected based on various characteristics such as flexibility, gas barrier properties, shock resistance, heat resistance, and the like. The same material is used for forming the electrode insulation layer 21 and the counter electrode insulation layer 22; however, materials different from each other may be used for forming them.

3. Lead layer

Next, the counter electrode lead layer 31 and the electrode lead layer 32 will now be described.

As illustrated in FIG. 1, the counter electrode lead layer 31 is a conductive portion that covers the side surface 11 and the electrode insulation layer 21 and is electrically connected to the counter electrode layer 120. Specifically, the counter electrode lead layer 31 covers the electrode insulation layer 21 and, of the side surface 11, a portion that is not covered by the electrode insulation layer 21.

At the portion, of the side surface 11, not covered by the electrode insulation layer 21, the end face of each of the counter electrode current collector 121 and the counter electrode active material layer 122 is exposed as illustrated in (*b*) of FIG. 5. Therefore, the counter electrode lead layer 31 is in contact with the end face of each of the counter electrode current collector 121 and the counter electrode active material layer 122 and is electrically connected to the counter electrode layer 120. Since the counter electrode active material layer 122 is made of a powdery material, there exist very fine asperities, similarly to the solid electrolyte layer 130. The counter electrode lead layer 31 enters the asperities in the end face of the counter electrode active material layer 122, and this increases the adhesion strength of the counter electrode lead layer 31 and improves electric connection reliability.

The counter electrode lead layer 31 is electrically connected to the counter electrode layer 120 of each of the plurality of battery cells 100. That is, the counter electrode lead layer 31 has a function of electrically connecting the battery cells 100 in parallel. As illustrated in FIG. 1, the counter electrode lead layer 31 covers almost the entirety of the side surface 11 from the lower end to the upper end thereof in a blanket manner.

In the power-generating element 10 according to the present embodiment, the uppermost layer is the counter electrode current collector 121. As illustrated in FIG. 1, at the upper end of the side surface 11, the counter electrode lead layer 31 covers a part of the principal surface of the counter electrode current collector 121 located at the uppermost layer, that is, the principal surface 15 of the power-generating element 10. Because of this structure, the counter electrode lead layer 31 is resistant to external stress, etc. applied in the z-axis direction, which suppresses its coming off. Moreover, since the area of contact of the counter electrode lead layer 31 and the counter electrode current collector 121 increases, the connection resistance of the counter electrode lead layer 31 and the counter electrode current collector 121 decreases, making it possible to improve large-current characteristics. For example, this makes it possible to charge the battery 1 quickly. In a case where the uppermost layer is the electrode current collector 111, the counter electrode lead layer 31 may indirectly cover the principal surface 15, with an insulation layer covering the electrode current collector 111 interposed therebetween.

The counter electrode lead layer 31 includes a first portion P1, which is connected to the counter electrode layer 120 of the battery cell 100 disposed closest to the principal surface 15 among the plurality of battery cells 100, and a second portion P2, which is connected to the counter electrode layer 120 of the battery cell 100 disposed farthest from the principal surface 15 among the plurality of battery cells 100. The first portion P1 is, specifically, a portion, of the counter electrode lead layer 31, located within the same range of distance from the principal surface 15 in the laminating direction as that of the counter electrode layer 120 of the battery cell 100 disposed closest to the principal surface 15 among the plurality of battery cells 100. The second portion P2 is, specifically, a portion, of the counter electrode lead layer 31, located within the same range of distance from the principal surface 15 in the laminating direction as that of the counter electrode layer 120 of the battery cell 100 disposed farthest from the principal surface 15 among the plurality of battery cells 100. Since the counter electrode current collector terminal 41 is disposed on the principal surface 15 in the present embodiment, the battery cell 100 disposed closest to, or farthest from, the principal surface 15 may be paraphrased as the battery cell 100 disposed closest to, or farthest from, the counter electrode current collector terminal 41. For example, each of the first portion P1 and the second portion P2 is in contact with the counter electrode layer 120 corresponding thereto.

In the counter electrode lead layer 31, the resistance of the first portion P1 is lower than the resistance of the second portion P2. This resistance is, specifically, an electric resistance to a current flowing through an electric connection path for the counter electrode layers 120 and the counter electrode current collector terminal 41. In the battery 1, a connection between the battery 1 and a wiring circuit (load) is provided via the counter electrode current collector terminal 41 and the electrode current collector terminal 42. Since the resistance of the first portion P1 is lower than the resistance of the second portion P2, the current flowing through the electric connection path for the counter electrode layers 120 and the counter electrode current collector terminal 41 is easier to flow at the first portion P1, at which a current corresponding to all of the counter electrode layers 120 of the plurality of battery cells 100 flows, than at the second portion P2, at which a current corresponding to one counter electrode layer 120 flows. Therefore, it is possible to enhance the uniformity of the current flowing between each of the counter electrode layers 120 and the counter electrode current collector terminal 41. This makes it easier to charge and discharge the counter electrode layers 120 uniformly and thus makes it possible to suppress overcharge and overdischarge of a particular battery cell 100. This effect is prominent especially when a large-current charging/discharging is performed.

In the present embodiment, the thickness of the counter electrode lead layer 31 at the first portion P1 is greater than the thickness of the counter electrode lead layer 31 at the second portion P2. In other words, the height of the first portion P1 from the side surface 11 is greater than the height of the second portion P2 from the side surface 11. Because of this structure, the cross-sectional area of the first portion P1 is larger than the cross-sectional area of the second portion P2 when the counter electrode lead layer 31 is cut in a thickness direction, and the resistance of the first portion P1 is thus lower than the resistance of the second portion P2. Since the above-described effect of enhancing current uniformity can be obtained just by adjusting the thickness of the counter electrode lead layer 31 as described above, it is possible to form the battery 1 easily.

The height of the counter electrode lead layer 31 from the side surface 11 increases toward the counter electrode current collector terminal 41 (that is, toward the principal surface 15) in the laminating direction. Because of this structure, the thickness of the counter electrode lead layer 31 is greater, and the resistance is lower, at the portion, of the counter electrode lead layer 31, connected to the counter electrode layer 120 disposed comparatively near the counter electrode current collector terminal 41. Therefore, it is possible to further enhance the uniformity of the current flowing between each of the counter electrode layers 120 and the counter electrode current collector terminal 41. The height of the counter electrode lead layer 31 from the side surface 11 can be paraphrased as the distance between the opposite surface of the counter electrode lead layer 31, which is the opposite of the side-surface-(11)-side surface, and the side surface 11. In the example illustrated in FIG. 1, the height of the counter electrode lead layer 31 increases with a gentle curve. However, this does not imply any limitation. The height may increase linearly or stepwise.

As illustrated in FIG. 1, the electrode lead layer 32 is a conductive portion that covers the side surface 12 and the counter electrode insulation layer 22 and is electrically connected to the electrode layer 110. Specifically, the electrode lead layer 32 covers the counter electrode insulation layer 22 and, of the side surface 12, a portion that is not covered by the counter electrode insulation layer 22.

At the portion, of the side surface 12, not covered by the counter electrode insulation layer 22, the end face of each of the electrode current collector 111 and the electrode active material layer 112 is exposed as illustrated in (*b*) of FIG. 6. Therefore, the electrode lead layer 32 is in contact with the end face of each of the electrode current collector 111 and the electrode active material layer 112 and is electrically connected to the electrode layer 110. Since the electrode active material layer 112 is made of a powdery material, there exist very fine asperities, similarly to the solid electrolyte layer 130. The electrode lead layer 32 enters the asperities in the end face of the electrode active material layer 112, and this increases the adhesion strength of the electrode lead layer 32 and improves electric connection reliability.

The electrode lead layer 32 is electrically connected to the electrode layer 110 of each of the plurality of battery cells 100. That is, the electrode lead layer 32 has a function of electrically connecting the battery cells 100 in parallel. As illustrated in FIG. 1, the electrode lead layer 32 covers almost the entirety of the side surface 12 from the lower end to the upper end thereof in a blanket manner.

In the power-generating element 10 according to the present embodiment, the lowermost layer is the electrode current collector 111. As illustrated in FIG. 1, at the lower end of the side surface 12, the electrode lead layer 32 covers a part of the principal surface of the electrode current collector 111 located at the lowermost layer, that is, the principal surface 16 of the power-generating element 10. Because of this structure, the electrode lead layer 32 is resistant to external stress, etc. applied in the z-axis direction, which suppresses its coming off. Moreover, since the area of contact of the electrode lead layer 32 and the electrode current collector 111 increases, the connection resistance of the electrode lead layer 32 and the electrode current collector 111 decreases, making it possible to improve large-current characteristics. For example, this makes it possible to charge the battery 1 quickly. In a case where the lowermost layer is the counter electrode current collector 121, the electrode lead layer 32 may indirectly cover the principal surface 16, with an insulation layer covering the counter electrode current collector 121 interposed therebetween.

The electrode lead layer 32 includes a third portion P3, which is connected to the electrode layer 110 of the battery cell 100 disposed closest to the principal surface 16 among the plurality of battery cells 100, and a fourth portion P4, which is connected to the electrode layer 110 of the battery cell 100 disposed farthest from the principal surface 16 among the plurality of battery cells 100. The third portion P3 is, specifically, a portion, of the electrode lead layer 32, located within the same range of distance from the principal surface 16 in the laminating direction as that of the electrode layer 110 of the battery cell 100 disposed closest to the principal surface 16 among the plurality of battery cells 100. The fourth portion P4 is, specifically, a portion, of the electrode lead layer 32, located within the same range of distance from the principal surface 16 in the laminating direction as that of the electrode layer 110 of the battery cell 100 disposed farthest from the principal surface 16 among the plurality of battery cells 100. Since the electrode current collector terminal 42 is disposed on the principal surface 16 in the present embodiment, the battery cell 100 disposed closest to, or farthest from, the principal surface 16 may be paraphrased as the battery cell 100 disposed closest to, or farthest from, the electrode current collector terminal 42. For example, each of the third portion P3 and the fourth portion P4 is in contact with the electrode layer 110 corresponding thereto.

In the electrode lead layer 32, the resistance of the third portion P3 is lower than the resistance of the fourth portion P4. This resistance is, specifically, an electric resistance to a current flowing through an electric connection path for the electrode layers 110 and the electrode current collector terminal 42. In the battery 1, a connection between the battery 1 and a wiring circuit (load) is provided via the counter electrode current collector terminal 41 and the electrode current collector terminal 42 Since the resistance of the third portion P3 is lower than the resistance of the fourth portion P4, the current flowing through the electric connection path for the electrode layers 110 and the electrode current collector terminal 42 is easier to flow at the third portion P3, at which a current corresponding to all of the electrode layers 110 of the plurality of battery cells 100 flows, than at the fourth portion P4, at which a current corresponding to one electrode layer 110 flows. Therefore, it is possible to enhance the uniformity of the current flowing between each of the electrode layers 110 and the electrode current collector terminal 42. This makes it easier to charge and discharge the electrode layers 110 uniformly and thus makes it possible to suppress overcharge and overdischarge of a particular battery cell 100. This effect is prominent especially when a large-current charging/discharging is performed.

In the present embodiment, the thickness of the electrode lead layer 32 at the third portion P3 is greater than the thickness of the electrode lead layer 32 at the fourth portion P4. In other words, the height of the third portion P3 from the side surface 12 is greater than the height of the fourth portion P4 from the side surface 12. Because of this structure, the cross-sectional area of the third portion P3 is larger than the cross-sectional area of the fourth portion P4 when the electrode lead layer 32 is cut in a thickness direction, and the resistance of the third portion P3 is thus lower than the resistance of the fourth portion P4. Since the above-described effect of enhancing current uniformity can be obtained just by adjusting the thickness of the electrode lead layer 32 as described above, it is possible to form the battery 1 easily.

The height of the electrode lead layer 32 from the side surface 12 increases toward the electrode current collector terminal 42 (that is, toward the principal surface 16) in the laminating direction. Because of this structure, the thickness of the electrode lead layer 32 is greater, and the resistance is lower, at the portion, of the electrode lead layer 32, connected to the electrode layer 110 disposed comparatively near the electrode current collector terminal 42. Therefore, it is possible to further enhance the uniformity of the current flowing between each of the electrode layers 110 and the electrode current collector terminal 42. The height of the electrode lead layer 32 from the side surface 12 can be paraphrased as the distance between the opposite surface of the electrode lead layer 32, which is the opposite of the side-surface-(12)-side surface, and the side surface 12. In the example illustrated in FIG. 1, the height of the electrode lead layer 32 increases with a gentle curve. However, this does not imply any limitation. The height may increase linearly or stepwise.

The counter electrode lead layer 31 and the electrode lead layer 32 are formed using a resin material having conductivity or the like. The resin material having conductivity contains, for example, a resin, and a conductive material filled in the resin and comprised of metal particles, etc. Alternatively, the counter electrode lead layer 31 and the electrode lead layer 32 may be formed using a metal material such as solder. The conductive material that can be used is selected based on various characteristics such as flexibility, gas barrier properties, shock resistance, heat resistance, solderability, and the like. The same material is used for forming the counter electrode lead layer 31 and the electrode lead layer 32; however, materials different from each other may be used for forming them.

4. Current Collector Terminal

Next, the counter electrode current collector terminal 41 and the electrode current collector terminal 42 will now be described.

The counter electrode current collector terminal 41 is a conductive terminal connected to the counter electrode lead layer 31. The counter electrode current collector terminal 41 is one of external connection terminals of the battery 1, and is, in the present embodiment, a positive electrode taking-out terminal. As illustrated in FIG. 1, the counter electrode current collector terminal 41 is disposed indirectly on the principal surface 15 of the power-generating element 10, with the counter electrode intermediate layer 51 interposed therebetween.

As illustrated in FIG. 2A, the counter electrode current collector terminal 41 is disposed apart from the side surface 11 in a plan view of the principal surface 15. That is, the counter electrode lead layer 31 is provided in such a way as to cover a region located between the side surface 11 and the counter electrode current collector terminal 41 as a portion of the principal surface 15. The counter electrode lead layer 31 provides a continuous cover from the side surface 11 onto the principal surface 15 and is connected to the counter electrode current collector terminal 41. The height of the counter electrode lead layer 31 from the principal surface 15, when configured in this way, is less than or equal to the height of the counter electrode current collector terminal 41 from the principal surface 15. That is, the counter electrode lead layer 31 is in contact with the end face of the counter electrode current collector terminal 41 in such a way as not to cover the upper surface of the counter electrode current collector terminal 41. Since the upper surface of the counter electrode current collector terminal 41 is the top surface of the battery 1, it is possible to perform a connection to the counter electrode current collector terminal 41 easily at the time of mounting of the battery 1. The counter electrode lead layer 31 may cover the upper surface of the counter electrode current collector terminal 41 as in the following positional relationship between the electrode lead layer 32 and the electrode current collector terminal 42.

The electrode current collector terminal 42 is a conductive terminal connected to the electrode lead layer 32. The electrode current collector terminal 42 is one of external connection terminals of the battery 1, and is, in the present embodiment, a negative electrode taking-out terminal. As illustrated in FIG. 1, the electrode current collector terminal 42 is disposed indirectly on the principal surface 16 of the power-generating element 10, with the electrode intermediate layer 52 interposed therebetween.

As illustrated in FIG. 2B, the electrode current collector terminal 42 is disposed apart from the side surface 12 in a plan view of the principal surface 16. That is, the electrode lead layer 32 is provided in such a way as to cover a region located between the side surface 12 and the electrode current collector terminal 42 as a portion of the principal surface 16. The electrode lead layer 32 provides a continuous cover from the side surface 12 onto the principal surface 16 and is connected to the electrode current collector terminal 42. The height of the electrode lead layer 32 from the principal surface 16, when configured in this way, is greater than or equal to the height of the electrode current collector terminal 42 from the principal surface 16. That is, the electrode lead layer 32 covers the lower surface of the electrode current collector terminal 42 and is in contact with the end face of the electrode current collector terminal 42. Since the lower surface of the electrode current collector terminal 42 is covered by the electrode lead layer 32, it is possible to suppress the coming off of the electrode current collector terminal 42. The electrode lead layer 32 may be configured not to cover the lower surface of the electrode current collector terminal 42 as in the above positional relationship between the counter electrode lead layer 31 and the counter electrode current collector terminal 41.

As described above, in the present embodiment, the counter electrode current collector terminal 41 and the electrode current collector terminal 42 are provided respectively on the principal surfaces 15 and 16 different from each other, of the power-generating element 10. Since the two terminals that differ in terms of polarity are disposed apart from each other, it is possible to suppress the occurrence of short circuiting. Moreover, since the battery 1 can be used in a state of being clamped between wiring terminals, use with easy detachment and attachment is achieved.

In the present embodiment, for example, the conductivity of the counter electrode current collector terminal 41 is higher than the conductivity of the counter electrode current collector 121. For example, the thickness (the length in the z-axis direction) of the counter electrode current collector terminal 41 is greater than the thickness of the counter electrode current collector 121. In addition, as illustrated in FIG. 2A, the counter electrode current collector terminal 41 is provided in such a way as to occupy more than a half of the principal surface 15. For example, the length (i.e., the length in the x-axis direction) of the counter electrode current collector terminal 41 is greater than or equal to a half of the length (i.e., the length in the x-axis direction) of the side surface 13, 14. For example, the width (i.e., the length in the y-axis direction) of the counter electrode current collector terminal 41 is greater than or equal to a half of the width (i.e., the length in the y-axis direction) of the side surface 11. It is possible to make the width of the counter electrode current collector terminal 41 roughly equal to the width (i.e., the length in the y-axis direction) of the counter electrode lead layer 31. Since this makes it possible to increase the width in relation to a direction in which a current flows from the counter electrode lead layer 31 to the counter electrode current collector terminal 41, it is possible to make the resistance lower, which is effective for taking out a large current. Moreover, since it is possible to ensure a large area of the counter electrode current collector terminal 41, it is possible to make the area of contact with a conductive portion on a mounting substrate larger and thus make the contact resistance lower when mounted onto the mounting substrate (not illustrated). The above structure is effective for taking out a large current in this respect, too. It should be noted that, in this specification, the meaning of "the conductivity of a member is high" is not that electric resistivity that is unique to a material of which the member is made is low but that a value obtained by dividing a cross section orthogonal to a direction in which a current flows by electric resistivity is large.

The conductivity of the electrode current collector terminal 42, for example, is higher than the conductivity of the electrode current collector 111. For example, the thickness (the length in the z-axis direction) of the electrode current collector terminal 42 is greater than the thickness of the electrode current collector 111. In addition, as illustrated in FIG. 2B, the electrode current collector terminal 42 is provided in such a way as to occupy more than a half of the principal surface 16. For example, the length (i.e., the length in the x-axis direction) of the electrode current collector terminal 42 is greater than or equal to a half of the length (i.e., the length in the x-axis direction) of the side surface 13, 14. For example, the width (i.e., the length in the y-axis direction) of the electrode current collector terminal 42 is greater than or equal to a half of the width (i.e., the length in the y-axis direction) of the side surface 12. It is possible to make the width of the electrode current collector terminal 42 roughly equal to the width (i.e., the length in the y-axis direction) of the electrode lead layer 32. Since this makes it possible to increase the width in relation to a direction in which a current flows from the electrode lead layer 32 to the electrode current collector terminal 42, it is possible to make the resistance lower, which is effective for taking out a large current. Moreover, since it is possible to ensure a large area of the electrode current collector terminal 42, it is possible to make the area of contact with a conductive portion on a mounting substrate larger and thus make the contact resistance lower when mounted onto the mounting substrate (not illustrated). The above structure is effective for taking out a large current in this respect, too.

Each of the counter electrode current collector terminal 41 and the electrode current collector terminal 42 is formed using a material having conductivity. For example, the counter electrode current collector terminal 41 and the electrode current collector terminal 42 are metal foils or metal sheets made of metal such as copper, aluminum, stainless, etc. Alternatively, the counter electrode current collector terminal 41 and the electrode current collector terminal 42 may be hardened solder.

5. Intermediate Layer

Next, the counter electrode intermediate layer 51 and the electrode intermediate layer 52 will now be described.

The counter electrode intermediate layer 51 is disposed between the counter electrode current collector terminal 41 and the principal surface 15. In the present embodiment, since the principal surface 15 is the principal surface of the counter electrode current collector 121, there is no need to ensure insulation for the counter electrode current collector terminal 41 and the principal surface 15. For this reason, the counter electrode intermediate layer 51 may be a conductive layer. The counter electrode intermediate layer 51 may be omitted.

The electrode intermediate layer 52 is disposed between the electrode current collector terminal 42 and the principal surface 16. In the present embodiment, since the principal surface 16 is the principal surface of the electrode current collector 111, there is no need to ensure insulation for the electrode current collector terminal 42 and the principal surface 16. For this reason, the electrode intermediate layer 52 may be a conductive layer. The electrode intermediate layer 52 may be omitted.

The shape of the counter electrode intermediate layer 51 in a plan view, and the size thereof, are the same as those of the counter electrode current collector terminal 41, but are not limited thereto. For example, the counter electrode intermediate layer 51 may be larger than, or smaller than, the counter electrode current collector terminal 41 in a plan view. For example, the counter electrode intermediate layer 51 may cover the entire area of the principal surface 15.

The shape of the electrode intermediate layer 52 in a plan view, and the size thereof, are the same as those of the electrode current collector terminal 42, but are not limited thereto. For example, the electrode intermediate layer 52 may be larger than, or smaller than, the electrode current collector terminal 42 in a plan view. For example, the electrode intermediate layer 52 may cover the entire area of the principal surface 16.

The counter electrode intermediate layer 51 and the electrode intermediate layer 52 are formed using, for example, an insulation material having electrical insulation properties. For example, each of the counter electrode intermediate layer 51 and the electrode intermediate layer 52 contains a resin. The resin is, for example, an epoxy-based resin, but is not limited thereto. An inorganic material may be used as the insulation material. The same material is used for forming the counter electrode intermediate layer 51 and the electrode intermediate layer 52; however, materials different from each other may be used for forming them. In a case where the counter electrode intermediate layer 51 and the electrode intermediate layer 52 are conductive layers, they can be formed using metal, a conductive resin, or the like.

Providing the counter electrode intermediate layer 51 and the electrode intermediate layer 52 makes it possible to adjust the levels of the counter electrode current collector terminal 41 and the electrode current collector terminal 42 from the principal surfaces 15 and 16 respectively.

In the present embodiment, the positions of the counter electrode current collector terminal 41 and the electrode current collector terminal 42 may be reversed. That is, the counter electrode current collector terminal 41 may be disposed on the principal surface 16, and the electrode current collector terminal 42 may be disposed on the principal surface 15. In this case, since the principal surface 16 is the principal surface of the electrode current collector 111, for the purpose of ensuring insulation for the principal surface 16 and the counter electrode current collector terminal 41, the counter electrode intermediate layer 51 made of an insulation layer is disposed between the principal surface 16 and the counter electrode current collector terminal 41. Similarly, since the principal surface 15 is the principal surface of the counter electrode current collector 121, for the purpose of ensuring insulation for the principal surface 15 and the electrode current collector terminal 42, the electrode intermediate layer 52 made of an insulation layer is disposed between the principal surface 15 and the electrode current collector terminal 42.

Besides ensuring insulation, the counter electrode intermediate layer 51 and the electrode intermediate layer 52 may have an additional function such as shock resistance, rust-proofing, water-proofing, or the like. A material suitable for these kinds of function can be used for the counter electrode intermediate layer 51 and the electrode intermediate layer 52. Each of the counter electrode intermediate layer 51 and the electrode intermediate layer 52 may have a layered structure made of a plurality of different materials.

6. Recapitulation

As described above, in the battery 1 according to the present embodiment, each of the counter electrode lead layer 31 and the electrode lead layer 32 has a function of electrically connecting the plurality of battery cells 100 in parallel. As illustrated in FIG. 1, since the counter electrode lead layer 31 and the electrode lead layer 32 are formed in such a way as to cover the side surfaces 11 and 12 of the power-generating element 10 respectively in tight contact therewith, it is possible to make their volume smaller. That is, as compared with a current-collecting tab electrode used in related art, the volume of a terminal electrode is smaller and, therefore, it is possible to improve energy density per volume of the battery 1.

Moreover, since the counter electrode current collector terminal 41, which is a member different from the counter electrode current collector 121 located at the uppermost layer, is provided such that the counter electrode intermediate layer 51, which is an insulation layer, is interposed therebetween, it is possible to suppress current concentration on the counter electrode current collector 121 located at the uppermost layer. According to the present embodiment, as a path for a current from each of the battery cells 100, the counter electrode lead layer 31 and the counter electrode current collector terminal 41, and the electrode lead layer 32 and the electrode current collector terminal 42, are used. For this reason, it is possible to suppress current concentration on the counter electrode current collector 121 located at the uppermost layer and thus enhance the reliability of the battery 1. The same holds true for the electrode current collector terminal 42 and the electrode intermediate layer 52 located at the lowermost layer.

A current corresponding to all of the counter electrode layers 120 of the plurality of battery cells 100 flows at the first portion P1, of the counter electrode lead layer 31, connected to the counter electrode layer 120 disposed closest to the counter electrode current collector terminal 41. On the other hand, a current corresponding to one counter electrode layer 120 flows at the second portion P2 connected to the counter electrode layer 120 disposed farthest from the counter electrode current collector terminal 41. In the counter electrode lead layer 31, the resistance of the first portion P1 is lower than the resistance of the second portion P2; therefore, the current flowing through the electric connection path for the counter electrode layers 120 and the counter electrode current collector terminal 41 is easier to flow at the first portion P1, at which the current corresponding to all of the counter electrode layers 120 flows, than at the second portion P2, at which the current corresponding to one counter electrode layer 120 flows. Therefore, it is possible to enhance the uniformity of the current flowing between each of the counter electrode layers 120 and the counter electrode current collector terminal 41. This makes it easier to charge and discharge the counter electrode layers 120 uniformly and thus makes it possible to suppress overcharge and overdischarge of a particular battery cell 100 and, consequently, enhance the reliability of the battery 1. The same holds true for the electrode lead layer 32.

Second Embodiment

Next, a second embodiment will now be described.

A battery according to the second embodiment is different from a battery according to the first embodiment in that side surfaces of a power-generating element are inclined with respect to the laminating direction. A description will be given below with a focus on the points of difference from the first embodiment, and the points of sameness will not be described or will be described in a simplified manner.

Figure 7:
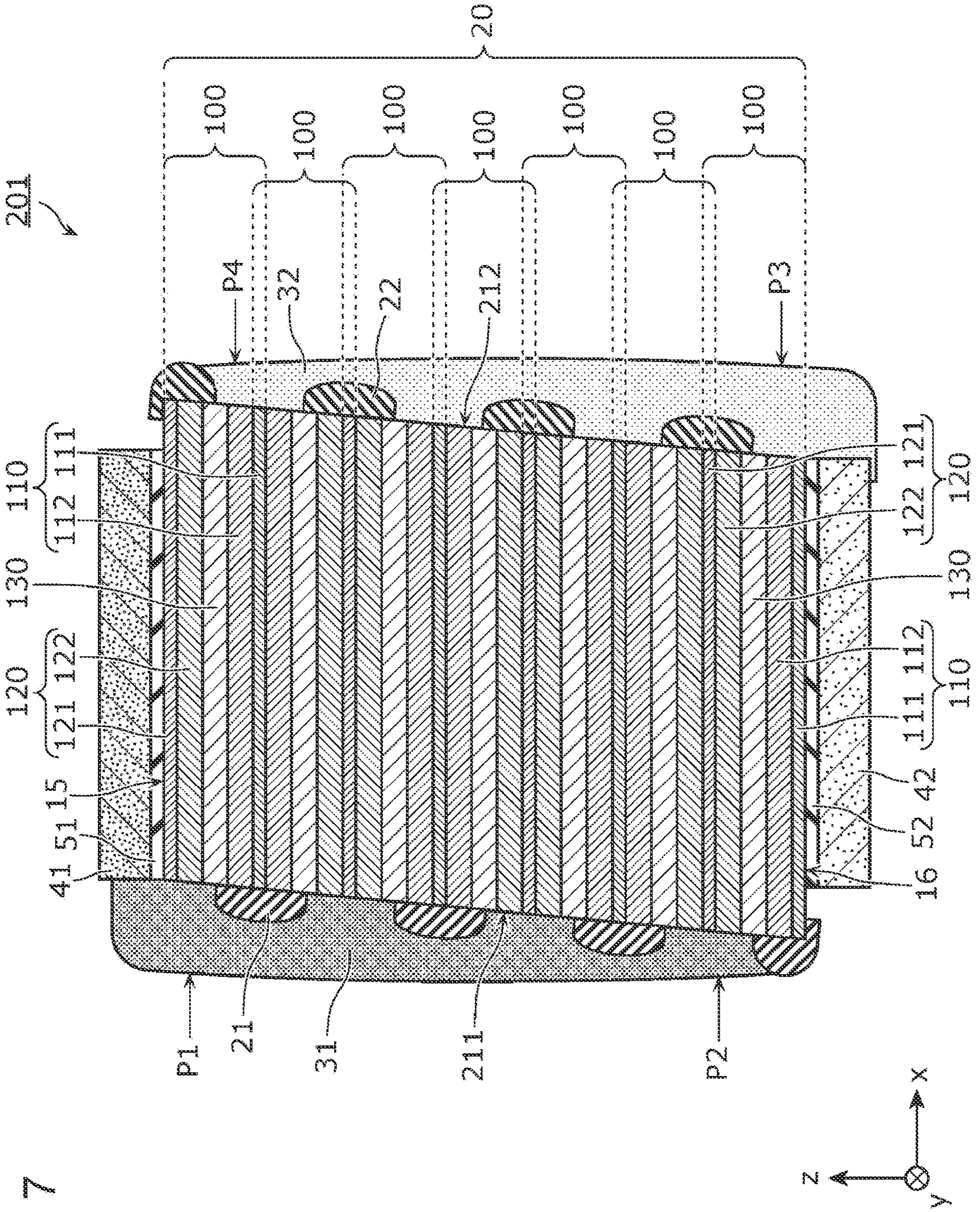
FIG. 7 is a cross-sectional view of a battery according to a second embodiment.

FIG. 7 is a cross-sectional view of a battery 201 according to the present embodiment. As illustrated in FIG. 7, the battery 201 is different from the battery 1 according to the first embodiment in that it includes a power-generating element 20 in place of the power-generating element 10. The power-generating element 20 includes side surfaces 211 and 212, which are inclined with respect to the laminating direction, in place of the side surfaces 11 and 12 of the power-generating element 10. Though not illustrated, the power-generating element 20 includes the side surfaces 13 and 14, which are parallel to the laminating direction similarly to those of the power-generating element 10, besides the side surfaces 211 and 212.

The side surface 211 is an example of a first side surface. The side surface 212 is an example of a second side surface. The side surfaces 211 and 212 are located opposite of each other and are parallel to each other. The side surfaces 211 and 212 extend from the two opposite sides of the principal surfaces 15 and 16 respectively.

The side surface 211 is inclined with respect to the laminating direction to configure an interior angle formed by the side surface 211 and the principal surface 15 as an obtuse angle. Therefore, the side surface 211 is inclined such that the principal-surface-(16)-side portion of the side surface 211 is located at an outer side relatively as compared with the principal-surface-(15)-side portion of the side surface 211. In addition, the side surface 212 is inclined with respect to the laminating direction to configure an interior angle formed by the side surface 212 and the principal surface 16 as an obtuse angle. Therefore, the side surface 212 is inclined such that the principal-surface-(15)-side portion of the side surface 212 is located at an outer side relatively as compared with the principal-surface-(16)-side portion of the side surface 212. Moreover, as illustrated in FIG. 7, the cross-sectional shape of the power-generating element 20 when cut in the laminating direction at a position going through the side surfaces 211 and 212 is a parallelogram. Because of this structure, even though the counter electrode lead layer 31 is thicker at the first portion P1, which is closer to the counter electrode current collector terminal 41, than at the second portion P2, and the electrode lead layer 32 is thicker at the third portion P3, which is closer to the electrode current collector terminal 42, than at the fourth portion P4, it is possible to approximate the angle of the external side surface of the counter electrode lead layer 31 with respect to the principal surface 15 and the angle of the external side surface of the electrode lead layer 32 with respect to the principal surface 16 to right angles. In particular, since the cross-sectional shape of the power-generating element 20 is a parallelogram as described above, it is possible to approximate the shape of the battery 201 as a whole to a rectangular parallelepiped. Therefore, for example, when the battery 201 is mounted onto a substrate, it is less likely that a wasteful space will be formed, and the mountability of the battery 201 onto the substrate improves.

The side surfaces 211 and 212 are, for example, cut surfaces formed by cutting a laminated body comprised of the plurality of battery cells 100 together. The side surfaces 211 and 212 are formed by cutting the laminated body comprised of the plurality of battery cells 100 together in a direction inclined with respect to the laminating direction at the time of cutting. The side surfaces of the power-generating element 20 other than the side surfaces 211 and 212 may be inclined with respect to the laminating direction similarly to the side surfaces 211 and 212.

Also in the battery 201, similarly to the battery 1, the thickness of the counter electrode lead layer 31 at the first portion P1 is greater than the thickness of the counter electrode lead layer 31 at the second portion P2. In other words, the height of the first portion P1 from the side surface 211 is greater than the height of the second portion P2 from the side surface 211. The thickness of the electrode lead layer 32 at the third portion P3 is greater than the thickness of the electrode lead layer 32 at the fourth portion P4. In other words, the height of the third portion P3 from the side surface 212 is greater than the height of the fourth portion P4 from the side surface 212.

The height of the counter electrode lead layer 31 from the side surface 211 increases toward the counter electrode current collector terminal 41 (that is, toward the principal surface 15) in the laminating direction.

The height of the electrode lead layer 32 from the side surface 212 increases toward the electrode current collector terminal 42 (that is, toward the principal surface 16) in the laminating direction.

In addition, in the battery 201, the side-surface-(211)-side end portion of the principal surface 15 is disposed in such a way as to overlap with the end portion of the counter electrode current collector terminal 41 in a plan view of the principal surface 15. The counter electrode current collector terminal 41 may be disposed apart from the side surface 211 in a plan view of the principal surface 15. In addition, the side-surface-(212)-side end portion of the principal surface 16 is disposed in such a way as to overlap with the end portion of the electrode current collector terminal 42 in a plan view of the principal surface 16. The electrode current collector terminal 42 may be disposed apart from the side surface 212 in a plan view of the principal surface 16.

Third Embodiment

Next, a third embodiment will now be described.

A battery according to the third embodiment is different from a battery according to the second embodiment in that a counter electrode current collector located at the uppermost layer is used as a counter electrode current collector terminal, and an electrode current collector located at the lowermost layer is used as an electrode current collector terminal. A description will be given below with a focus on the points of difference from the first and second embodiments, and the points of sameness will not be described or will be described in a simplified manner.

Figure 8:
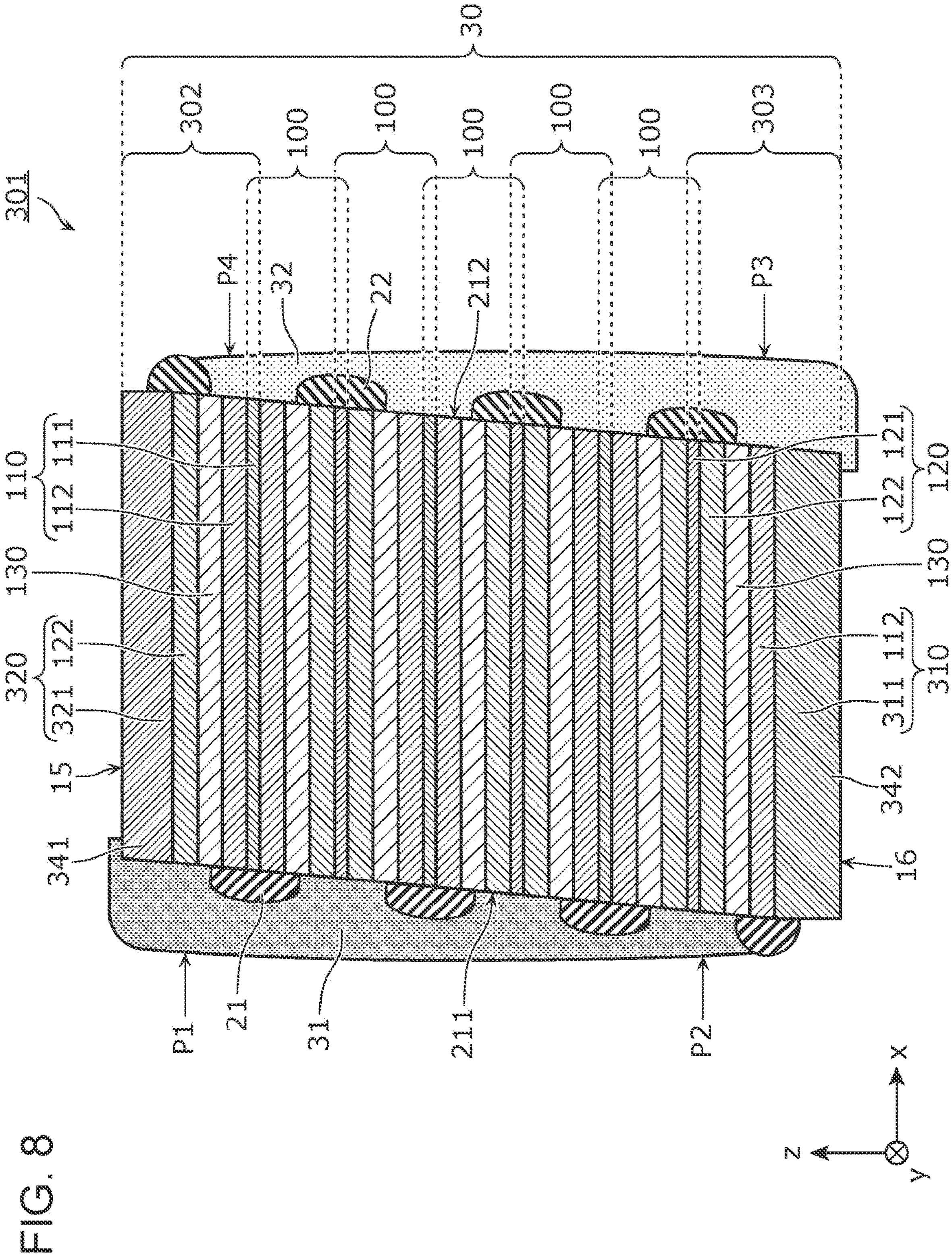
FIG. 8 is a cross-sectional view of a battery according to a third embodiment.

FIG. 8 is a cross-sectional view of a battery 301 according to the present embodiment. As illustrated in FIG. 8, the battery 301 is different from the battery 201 according to the second embodiment in that it includes a counter electrode current collector terminal 341 and an electrode current collector terminal 342 in place of the counter electrode current collector terminal 41, the electrode current collector terminal 42, the counter electrode intermediate layer 51, and the electrode intermediate layer 52, and includes a power-generating element 30 in place of the power-generating element 20. The power-generating element 30 of the battery 301 includes battery cells 302 and 303 in place of the two battery cells 100 located at the uppermost portion and the lowermost portion of the power-generating element 20. The power-generating element 30 includes the side surfaces 211 and 212, which are inclined with respect to the laminating direction, and the principal surfaces 15 and 16, which are the top and bottom surfaces, similarly to the power-generating element 20.

The battery cell 302 is located at the uppermost portion of the power-generating element 30. Unlike the other battery cells 100, the battery cell 302 includes a counter electrode layer 320 in place of the counter electrode layer 120. The counter electrode layer 320 includes a counter electrode current collector 321, which is thicker than the counter electrode current collector 121. The counter electrode current collector 321 is the uppermost layer of the power-generating element 30. That is, the upper surface of the counter electrode current collector 321 is the principal surface 15 of the power-generating element 30.

The battery cell 303 is located at the lowermost portion of the power-generating element 30. Unlike the other battery cells 100, the battery cell 303 includes an electrode layer 310 in place of the electrode layer 110. The electrode layer 310 includes an electrode current collector 311, which is thicker than the electrode current collector 111. The electrode current collector 311 is the lowermost layer of the power-generating element 30. That is, the lower surface of the electrode current collector 311 is the principal surface 16 of the power-generating element 30.

In the battery 301 according to the present embodiment, the counter electrode current collector 321 located at the uppermost layer functions as the counter electrode current collector terminal 341. That is, the counter electrode current collector terminal 341 is the member constituting the principal surface 15, that is, the counter electrode current collector 321 located at the uppermost layer. The electrode current collector 311 located at the lowermost layer functions as the electrode current collector terminal 342. That is, the electrode current collector terminal 342 is the member constituting the principal surface 16, that is, the electrode current collector 311 located at the lowermost layer.

The counter electrode current collector 321 located at the uppermost layer is thicker than the other counter electrode current collectors 121, and the electrode current collector 311 located at the lowermost layer is thicker than the other electrode current collectors 111. Because of this structure, a current is easier to flow through the counter electrode current collector 321 and the electrode current collector 311 than the other counter electrode current collectors 121 and the other electrode current collectors 111.

It is possible to reduce the number of parts by causing the counter electrode current collector 321, through which a current is easier to flow, to function as the counter electrode current collector terminal 341 and causing the electrode current collector 311, through which a current is easier to flow, to function as the electrode current collector terminal 342 as described above. Since a current is easier to flow through the counter electrode current collector 321 and the electrode current collector 311, it is possible to suppress heat generation caused by current concentration.

Though an example in which current collectors are used for both the counter electrode current collector terminal 341 and the electrode current collector terminal 342 has been disclosed in the present embodiment, the current collector may be used for either one only. For example, the battery 301 may include the counter electrode current collector terminal 41 and the counter electrode current collector 121, which have been described earlier, in place of the counter electrode current collector terminal 341. Alternatively, the battery 301 may include the electrode current collector terminal 42 and the electrode current collector 111, which have been described earlier, in place of the electrode current collector terminal 342. Though both the counter electrode current collector 321 and the electrode current collector 311 are thicker than the other counter electrode current collectors 121 and the other electrode current collectors 111 respectively, this does not imply any limitation. For example, at least one of the counter electrode current collector 321 and the electrode current collector 311 may have the same thickness as the other counter electrode current collectors 121 and the other electrode current collectors 111. At least one of the counter electrode current collector 321 and the electrode current collector 311 may be made of a material having higher conductivity than that of the other counter electrode current collectors 121 and the other electrode current collectors 111.

Fourth Embodiment

Next, a fourth embodiment will now be described.

A battery according to the fourth embodiment is different from a battery according to the second embodiment in that a lead layer is formed using a plurality of different materials. A description will be given below with a focus on the points of difference from the first to third embodiments, and the points of sameness will not be described or will be described in a simplified manner.

Figure 9:
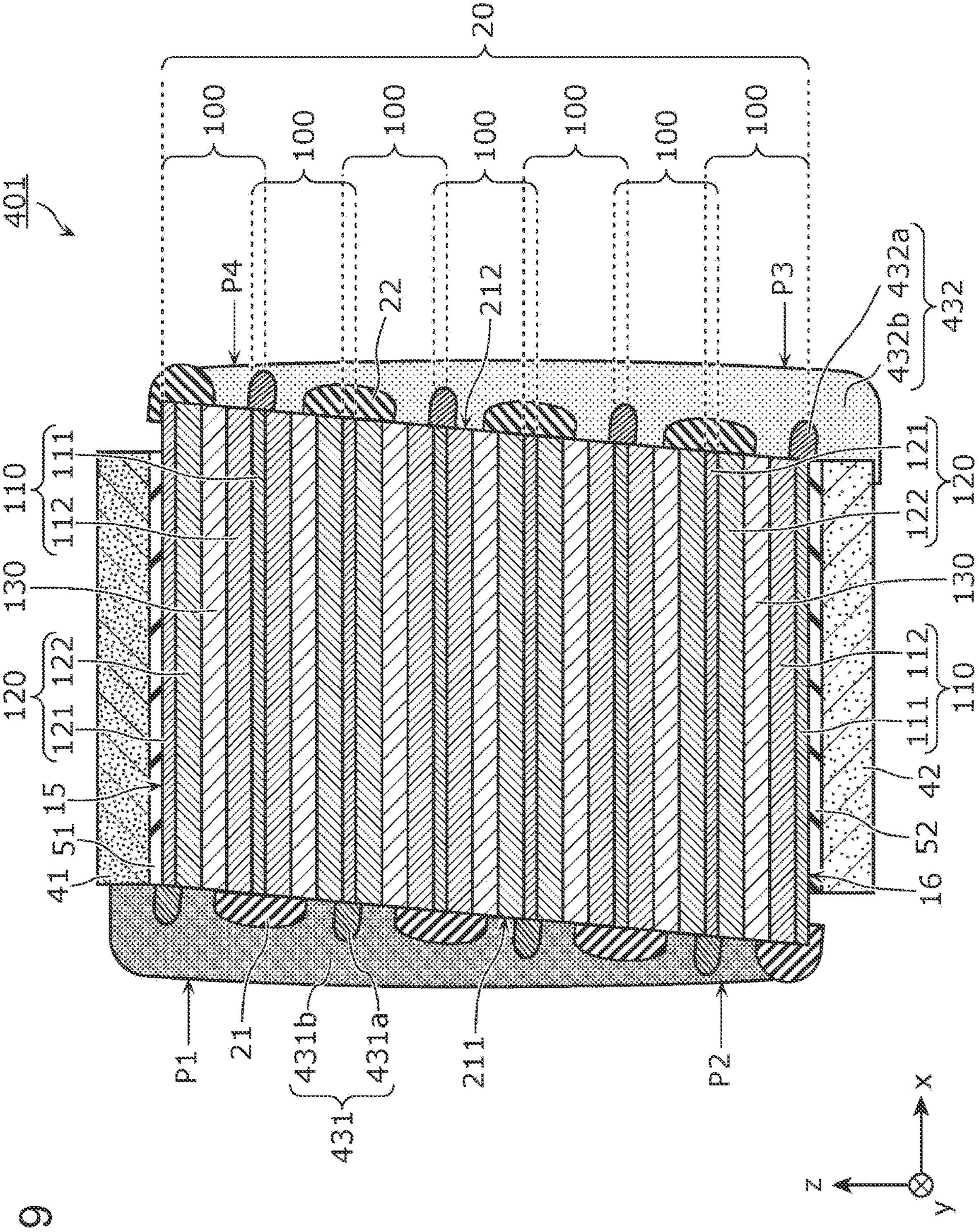
FIG. 9 is a cross-sectional view of a battery according to a fourth embodiment.

FIG. 9 is a cross-sectional view of a battery 401 according to the present embodiment. As illustrated in FIG. 9, the battery 401 is different from the battery 1 according to the first embodiment in that it includes a counter electrode lead layer 431 and an electrode lead layer 432 in place of the counter electrode lead layer 31 and the electrode lead layer 32.

The counter electrode lead layer 431 includes a first conductive member 431*a* and a second conductive member 431*b*. The second conductive member 431*b* is the same as the counter electrode lead layer 31 according to the first embodiment in that it covers the first conductive member 431*a*. In the present embodiment, the second conductive member 431*b* is connected to the counter electrode current collector terminal 41.

The first conductive member 431*a* is a conductive member that covers at least a part of the counter electrode layer 120 at the side surface 211. Specifically, the first conductive member 431*a* is in contact with, and covers, the end face of the counter electrode current collector 121 and a part of the end face of the counter electrode active material layer 122. For example, the first conductive member 431*a* is provided individually for each of the counter electrode current collectors 121 and covers the whole of the end face of the counter electrode current collector 121. The first conductive member 431*a* has a stripe shape in a plan view of the side surface 211. On the side surface 211, the first conductive member 431*a* and the electrode insulation layer 21 are arranged alternately one for one in the z-axis direction.

All of the plurality of first conductive members 431*a* are covered by the second conductive member 431*b* and are electrically connected thereto. That is, the counter electrode layers 120 of the plurality of battery cells 100 are each electrically connected to the second conductive member 431*b* via the corresponding one of the first conductive members 431*a*, and are electrically connected in parallel via the second conductive member 431*b*.

The first conductive member 431*a* has properties different from those of the second conductive member 431*b*. For example, the first conductive member 431*a* and the second conductive member 431*b* are formed using materials different from each other. Specifically, the first conductive member 431*a* is formed using a material selected with a focus on high conductivity, alloying with the counter electrode current collector 121, and the like. The second conductive member 431*b* is formed using a material selected with a focus on flexibility, shock resistance, chemical stability, cost, ease of expansion at the time of work, and the like.

Also in the counter electrode lead layer 431, similarly to the counter electrode lead layer 31, the resistance of the first portion P1 is lower than the resistance of the second portion P2. The thickness of the counter electrode lead layer 431 at the first portion P1 is greater than the thickness of the counter electrode lead layer 431 at the second portion P2.

The electrode lead layer 432 includes a first conductive member 432*a* and a second conductive member 432*b*. The second conductive member 432*b* is the same as the electrode lead layer 32 according to the first embodiment in that it covers the first conductive members 432*a*. In the present embodiment, the second conductive member 432*b* is connected to the electrode current collector terminal 42.

The first conductive member 432*a* is a conductive member that covers at least a part of the electrode layer 110 at the side surface 212. Specifically, the first conductive member 432*a* is in contact with, and covers, the end face of the electrode current collector 111 and a part of the end face of the electrode active material layer 112. For example, the first conductive member 432*a* is provided individually for each of the electrode current collectors 111 and covers the whole of the end face of the electrode current collector 111. The first conductive member 432*a* has a stripe shape in a plan view of the side surface 212. On the side surface 212, the first conductive member 432*a* and the counter electrode insulation layer 22 are arranged alternately one for one in the z-axis direction.

All of the plurality of first conductive members 432*a* are covered by the second conductive member 432*b* and are electrically connected thereto. That is, the electrode layers 110 of the plurality of battery cells 100 are each electrically connected to the second conductive member 432*b* via the corresponding one of the first conductive members 432*a*, and are electrically connected in parallel via the second conductive member 432*b*.

The first conductive member 432*a* has properties different from those of the second conductive member 432*b*. For example, the first conductive member 432*a* and the second conductive member 432*b* are formed using materials different from each other. Specifically, the first conductive member 432*a* is formed using a material selected with a focus on high conductivity, alloying with the electrode current collector 111, and the like. The second conductive member 432*b* is formed using a material selected with a focus on flexibility, shock resistance, chemical stability, cost, ease of expansion at the time of work, and the like.

Also in the electrode lead layer 432, similarly to the electrode lead layer 32, the resistance of the third portion P3 is lower than the resistance of the fourth portion P4. The thickness of the electrode lead layer 432 at the third portion P3 is greater than the thickness of the electrode lead layer 432 at the fourth portion P4.

As described above, appropriate materials can be used as the materials used for forming the lead layers of the battery 401, and it is possible to improve battery performance and enhance the ease of battery manufacturing.

In FIG. 9, an example in which the first conductive members 431*a* are connected to all of the counter electrode current collectors 121 is illustrated; however, the counter electrode current collector 121 to which the first conductive member 431*a* is not connected may exist. The same holds true for the electrode current collector 111. Either one of the first conductive members 431*a* and 432*a* may be omitted.

Fifth Embodiment

Next, a fifth embodiment will now be described.

A battery according to the fifth embodiment is different from a battery according to the second embodiment in terms of a direction in which a side surface of a power-generating element is inclined with respect to the laminating direction. A description will be given below with a focus on the points of difference from the first to fourth embodiments, and the points of sameness will not be described or will be described in a simplified manner.

Figure 10:
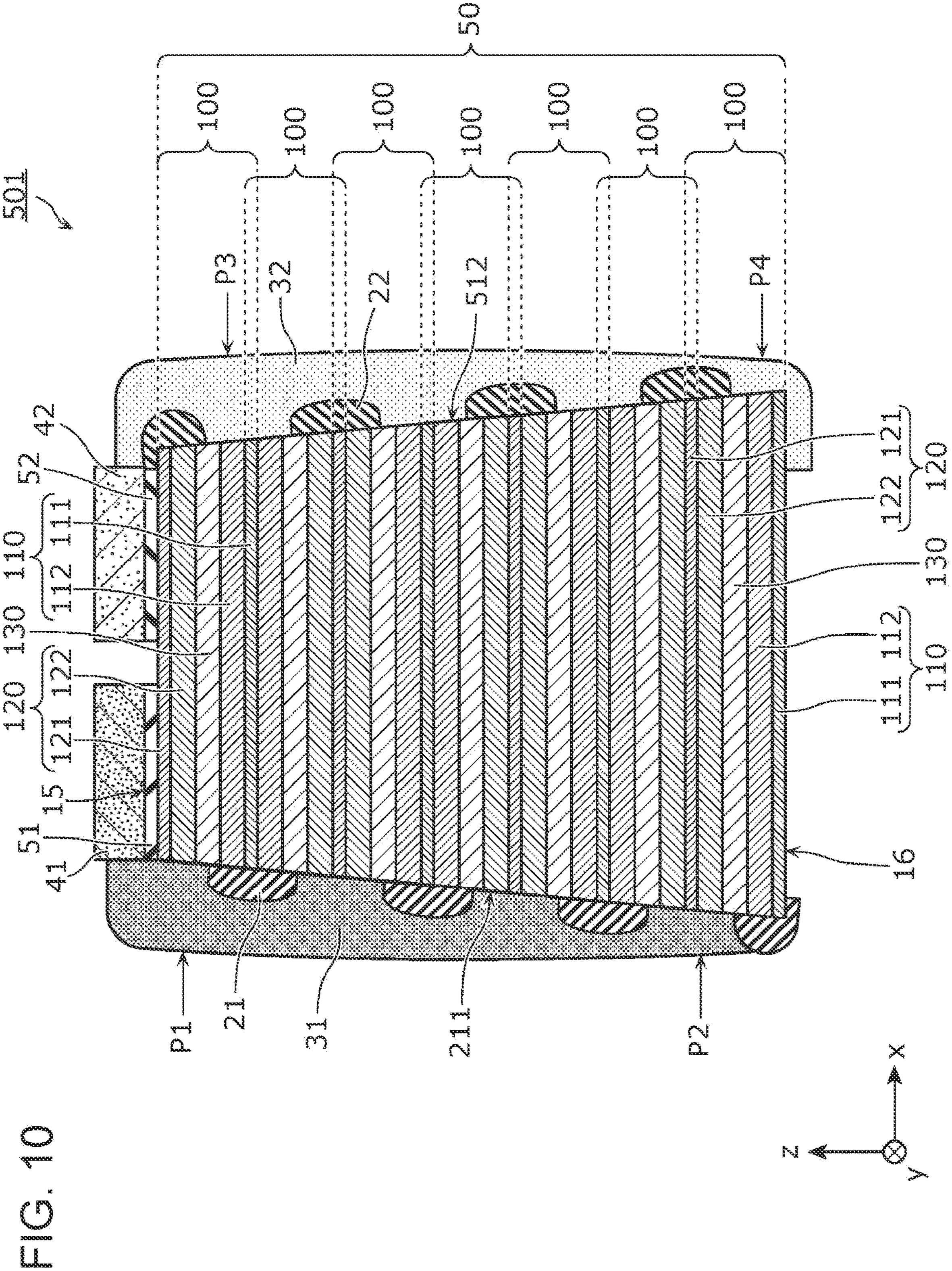
FIG. 10 is a cross-sectional view of a battery according to a fifth embodiment.

FIG. 10 is a cross-sectional view of a battery 501 according to the present embodiment. As illustrated in FIG. 10, the battery 501 is different from the battery 201 according to the second embodiment in that it includes a power-generating element 50 in place of the power-generating element 20 and in that the electrode current collector terminal 42 and the electrode intermediate layer 52 are disposed on the principal surface 15. The power-generating element 50 includes a side surface 512 in place of the side surface 212 of the power-generating element 20. Though not illustrated, the power-generating element 50 includes the side surfaces 13 and 14, which are parallel to the laminating direction similarly to those of the power-generating element 10, besides the side surfaces 211 and 512.

The side surface 512 is an example of a second side surface. The side surfaces 211 and 512 are located opposite of each other. The side surfaces 211 and 512 extend from the two opposite sides of the principal surfaces 15 and 16 respectively.

The side surface 512 is inclined with respect to the laminating direction to configure an interior angle formed by the side surface 512 and the principal surface 15 as an obtuse angle. Therefore, the side surface 512 is inclined such that the principal-surface-(16)-side portion of the side surface 512 is located at an outer side relatively as compared with the principal-surface-(15)-side portion of the side surface 512. An interior angle formed by the side surface 211 and the principal surface 15 and an interior angle formed by the side surface 512 and the principal surface 15 are, for example, equal to each other. Moreover, as illustrated in FIG. 10, the cross-sectional shape of the power-generating element 50 when cut in the laminating direction at a position going through the side surfaces 211 and 512 is a trapezoid, more specifically, an isosceles trapezoid. Because of this structure, even though the counter electrode lead layer 31 is thicker at the first portion P1, which is closer to the counter electrode current collector terminal 41, than at the second portion P2, and the electrode lead layer 32 is thicker at the third portion P3, which is closer to the electrode current collector terminal 42, than at the fourth portion P4, it is possible to approximate the angle of the external side surface of the counter electrode lead layer 31 with respect to the principal surface 15 and the angle of the external side surface of the electrode lead layer 32 with respect to the principal surface 15 to right angles. In particular, since the cross-sectional shape of the power-generating element 50 is a trapezoid as described above, it is possible to approximate the shape of the battery 501 as a whole to a rectangular parallelepiped. Therefore, for example, when the battery 501 is mounted onto a substrate, it is less likely that a wasteful space will be formed, and it is possible to make the size of the substrate smaller.

In the battery 501, the electrode lead layer 32 includes the third portion P3, which is connected to the electrode layer 110 of the battery cell 100 disposed closest to the principal surface 15 among the plurality of battery cells 100, and the fourth portion P4, which is connected to the electrode layer 110 of the battery cell 100 disposed farthest from the principal surface 15 among the plurality of battery cells 100. The third portion P3 is, specifically, a portion, of the electrode lead layer 32, located within the same range of distance from the principal surface 15 in the laminating direction as that of the electrode layer 110 of the battery cell 100 disposed closest to the principal surface 15 among the plurality of battery cells 100. The fourth portion P4 is, specifically, a portion, of the electrode lead layer 32, located within the same range of distance from the principal surface 15 in the laminating direction as that of the electrode layer 110 of the battery cell 100 disposed farthest from the principal surface 15 among the plurality of battery cells 100. Since the electrode current collector terminal 42 is disposed on the principal surface 15 in the present embodiment, the battery cell 100 disposed closest to, or farthest from, the principal surface 15 may be paraphrased as the battery cell 100 disposed closest to, or farthest from, the electrode current collector terminal 42.

Also in the present embodiment, the resistance of the third portion P3 is lower than the resistance of the fourth portion P4. The thickness of the electrode lead layer 32 at the third portion P3 is greater than the thickness of the electrode lead layer 32 at the fourth portion P4.

In the battery 501, the height of the electrode lead layer 32 from the side surface 512 increases toward the electrode current collector terminal 42 (that is, toward the principal surface 15) in the laminating direction.

In the battery 501, the electrode current collector terminal 42 is disposed indirectly on the principal surface 15 of the power-generating element 50, with the electrode intermediate layer 52 interposed therebetween. The electrode current collector terminal 42 is in contact with an upper end portion of the electrode lead layer 32.

As described above, in the present embodiment, the counter electrode current collector terminal 41 and the electrode current collector terminal 42 are provided on the same principal surface 15 of the power-generating element 50.

The counter electrode current collector terminal 41 and the electrode current collector terminal 42 are arranged in this order in a direction from the side surface 211 toward the side surface 512 (that is, in the positive direction along the x axis). Specifically, when the principal surface 15 is virtually bisected into two areas with respect to a virtual line parallel to the y axis, the counter electrode current collector terminal 41 is provided at the area of the negative side of the x axis and the electrode current collector terminal 42 is provided at the area of the positive side of the x axis.

For example, the width (i.e., the length in the y-axis direction) of the counter electrode current collector terminal 41 is greater than or equal to a half of the width (i.e., the length in the y-axis direction) of the side surface 211. It is possible to make the width of the counter electrode current collector terminal 41 roughly equal to the width (i.e., the length in the y-axis direction) of the counter electrode lead layer 31. Since this makes it possible to increase the width in relation to a direction in which a current flows from the counter electrode lead layer 31 to the counter electrode current collector terminal 41, it is possible to make the resistance lower, which is effective for taking out a large current. The same holds true for the electrode current collector terminal 42.

As described above, in the battery 501, the counter electrode current collector terminal 41 and the electrode current collector terminal 42 are provided on the principal surface 15 of the power-generating element 50. That is, both the positive terminal and the negative terminal that are required for taking out a current from the power-generating element 50 are provided on the same principal surface 15. For example, the principal surface 15 is larger in area than the side surface 211, 512, 13, 14. Since the terminals are provided on the surface having a large area, it is possible to perform large-area mounting of the battery 501 and thus enhance connection reliability. Moreover, since it is possible to adjust the shape and arrangement of the terminals in accordance with the wiring layout of the substrate onto which they are to be mounted, it is possible to enhance the degree of freedom in connection.

Furthermore, since both the positive terminal and the negative terminal are provided on the same principal surface, it is possible to achieve compact mounting of the battery 501. For example, it is possible to make the pattern of connection terminals formed on the mounting substrate (also called as "footprint") smaller. Furthermore, low-profile mounting onto the mounting substrate is realized because the mounting can be performed in a state in which the principal surface 15 of the battery 501 and the mounting substrate are disposed parallel to each other. Reflow soldering or the like can be used for the mounting. As described above, the battery 501 that offers great mountability is realized.

Sixth Embodiment

Next, a sixth embodiment will now be described.

A battery according to the sixth embodiment is different from a battery according to the fifth embodiment in that a counter electrode current collector located at the uppermost layer is used as a counter electrode current collector terminal. A description will be given below with a focus on the points of difference from the first to fifth embodiments, and the points of sameness will not be described or will be described in a simplified manner.

Figure 11:
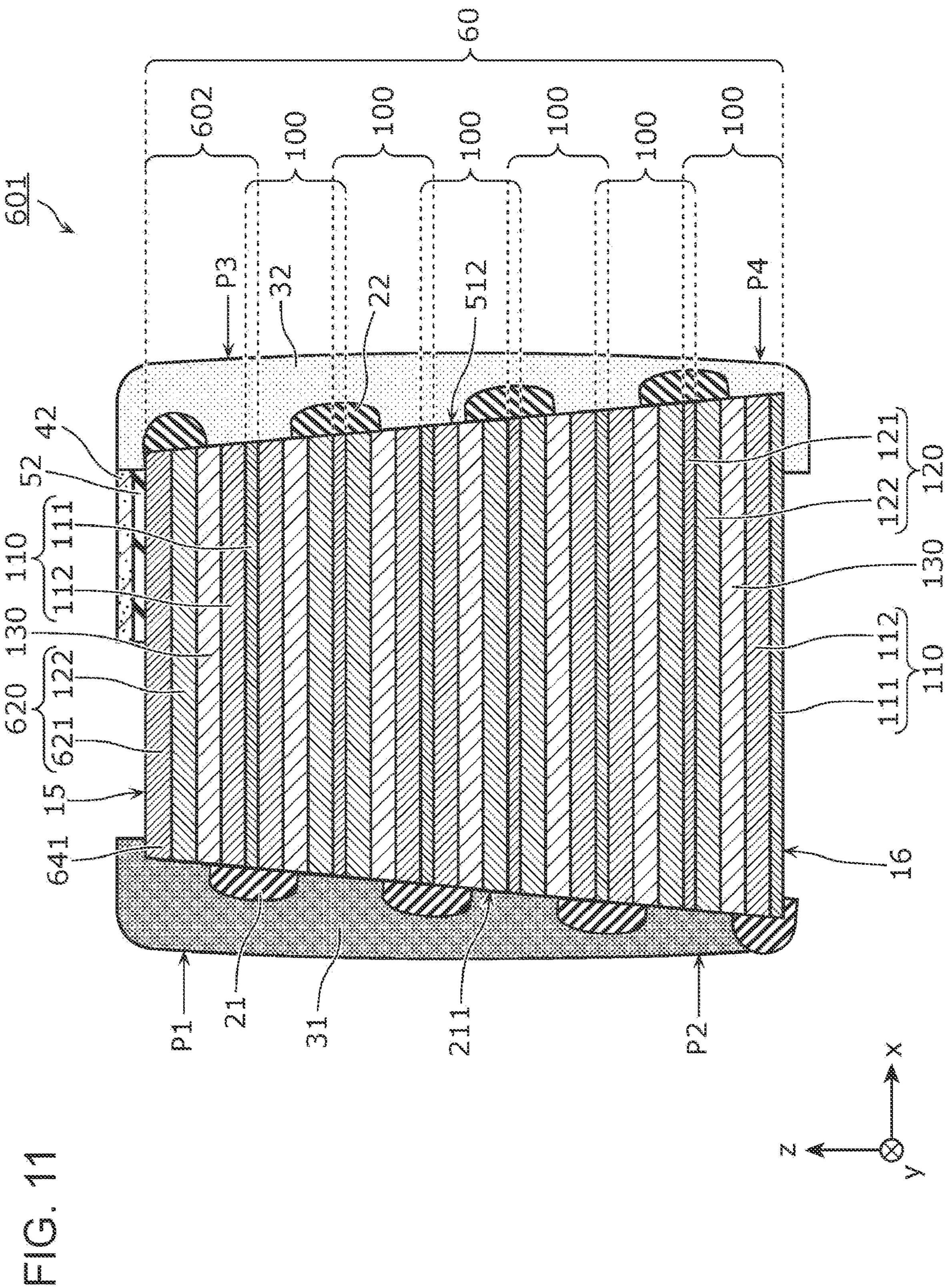
FIG. 11 is a cross-sectional view of a battery according to a sixth embodiment.

FIG. 11 is a cross-sectional view of a battery 601 according to the present embodiment. As illustrated in FIG. 11, the battery 601 is different from the battery 501 according to the fifth embodiment in that it does not include the counter electrode current collector terminal 41 nor the counter electrode intermediate layer 51 and includes a power-generating element 60 in place of the power-generating element 50. The power-generating element 60 of the battery 601 includes a battery cell 602 in place of the battery cell 100 located at the uppermost portion of the power-generating element 50. The power-generating element 60 includes the side surfaces 211 and 512, which are inclined with respect to the laminating direction, and the principal surfaces 15 and 16, which are the top and bottom surfaces, similarly to the power-generating element 50.

The battery cell 602 is located at the uppermost portion of the power-generating element 60. Unlike the other battery cells 100, the battery cell 602 includes a counter electrode layer 620 in place of the counter electrode layer 120. The counter electrode layer 620 includes a counter electrode current collector 621, which is thicker than the counter electrode current collector 121. The counter electrode current collector 621 is the uppermost layer of the power-generating element 60. That is, the upper surface of the counter electrode current collector 621 is the principal surface 15 of the power-generating element 60.

In the battery 601 according to the present embodiment, a part of the counter electrode current collector 621 located at the uppermost layer functions as a counter electrode current collector terminal 641. That is, the counter electrode current collector terminal 641 is the member constituting the principal surface 15, that is, the counter electrode current collector 621 located at the uppermost layer. On the other hand, similarly to the fifth embodiment, the electrode current collector terminal 42 is a member different from the counter electrode current collector 621 located at the uppermost layer constituting the principal surface 15.

The counter electrode current collector 621 located at the uppermost layer is similar to the counter electrode current collector terminal 341 and the electrode current collector terminal 342, which have been described earlier, and, for example, is configured to be thicker than the other counter electrode current collectors 121 and the electrode current collectors 111. Because of this structure, a current is easier to flow through the counter electrode current collector 621 than the other counter electrode current collectors 121 and the electrode current collectors 111.

It is possible to reduce the number of parts by causing the counter electrode current collector 621, through which a current is easier to flow, to function as the counter electrode current collector terminal 641 as described above. Since a current is easier to flow through the counter electrode current collector 621, it is possible to suppress heat generation caused by current concentration.

Seventh Embodiment

Next, a seventh embodiment will now be described.

A battery according to the seventh embodiment is different from a battery according to the second embodiment in that it includes a sealing member. A description will be given below with a focus on the points of difference from the first to sixth embodiments, and the points of sameness will not be described or will be described in a simplified manner.

Figure 12:
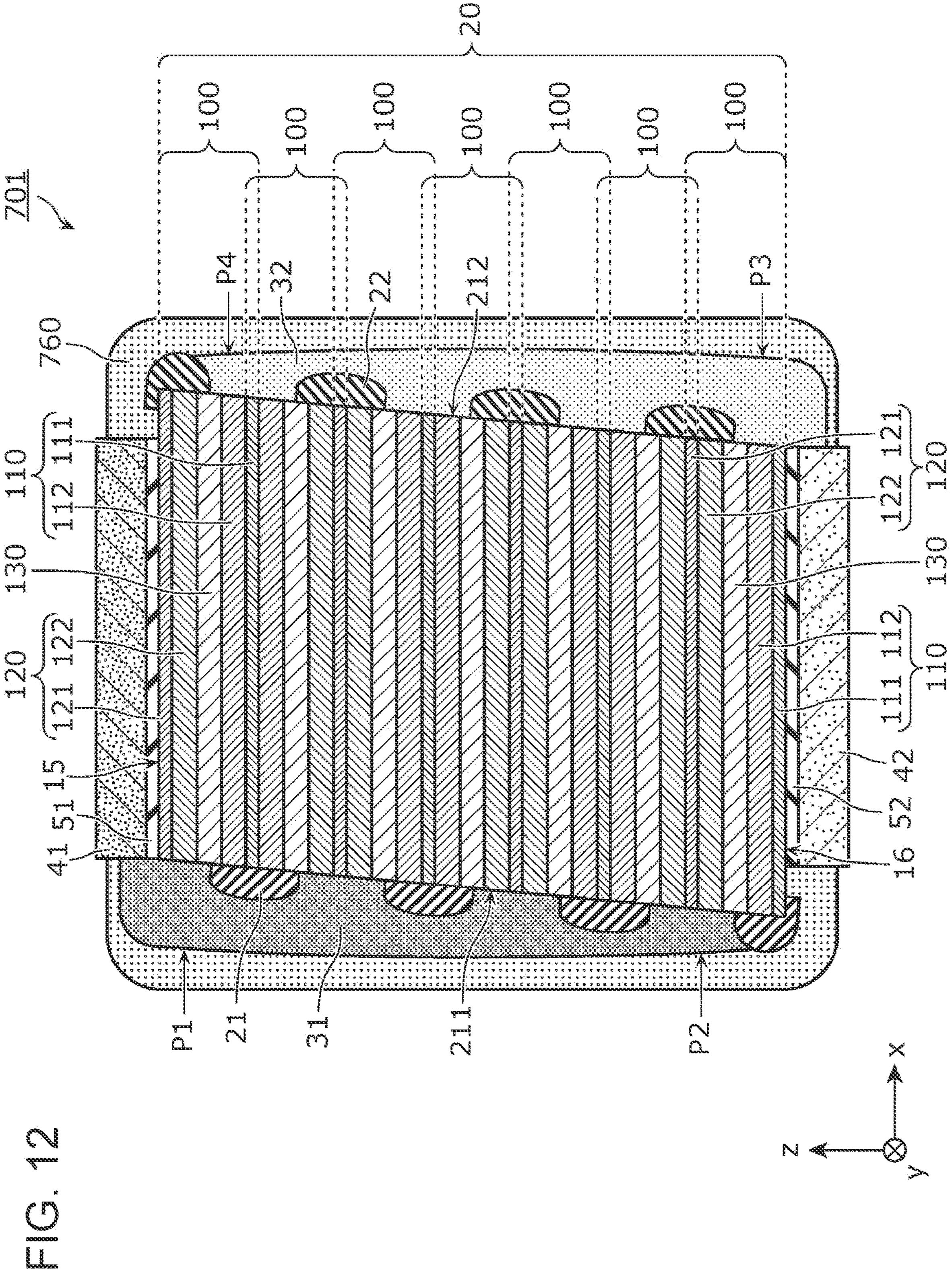
FIG. 12 is a cross-sectional view of a battery according to a seventh embodiment.
Figure 13A:
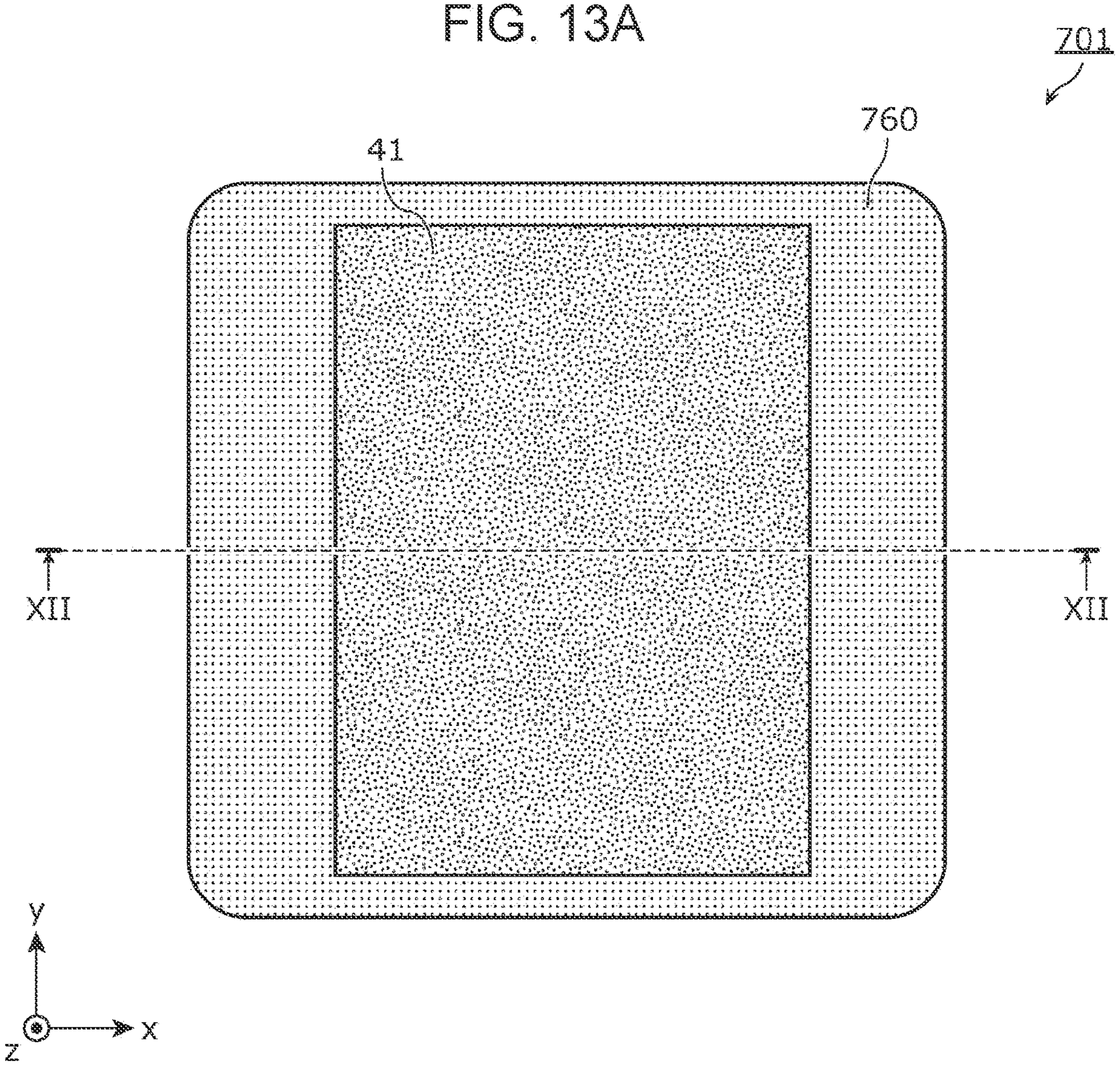
FIG. 13A is a top view of the battery according to the seventh embodiment.
Figure 13B:
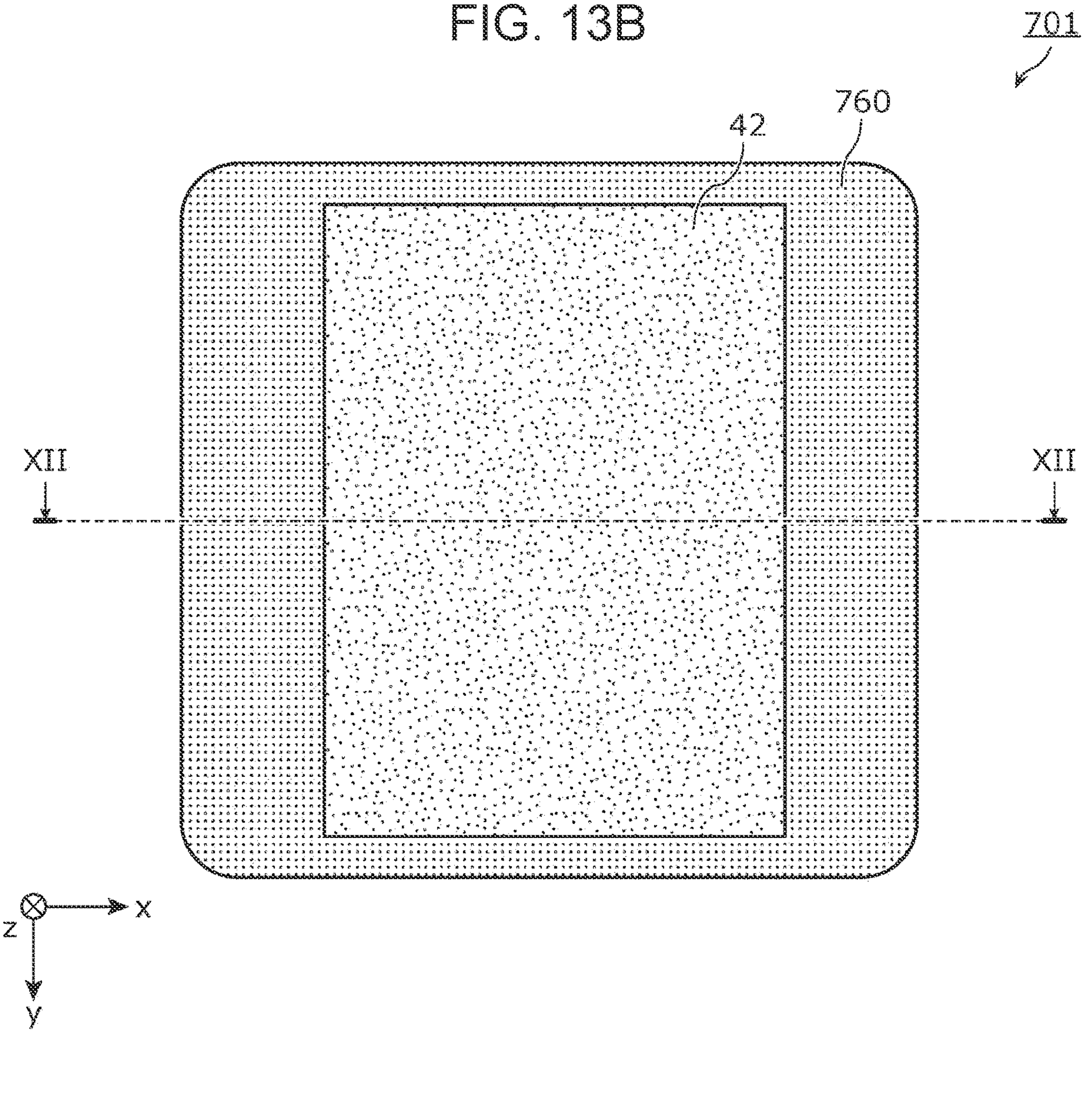
FIG. 13B is a bottom view of the battery according to the seventh embodiment.

FIG. 12 is a cross-sectional view of a battery 701 according to the present embodiment. FIG. 13A is a top view of the battery 701 according to the present embodiment. FIG. 13B is a bottom view of the battery 701 according to the present embodiment. FIG. 12 illustrates a cross section taken along the line XII-XII of FIGS. 13A and 13B. As illustrated in FIGS. 12, 13A, and 13B, the battery 701 is different from the battery 201 according to the second embodiment in that it includes a sealing member 760.

The sealing member 760 exposes at least a part of each of the counter electrode current collector terminal 41 and the electrode current collector terminal 42 and encapsulates the power-generating element 20. The sealing member 760 is, for example, provided in such a way as not to expose the power-generating element 20, the electrode insulation layer 21, the counter electrode insulation layer 22, the counter electrode lead layer 31, and the electrode lead layer 32.

The sealing member 760 is formed using, for example, an insulation material having electrical insulation properties. A material of a sealing member of a battery that is generally known, for example, a sealant, can be used as the insulation material. For example, a resin material can be used as the insulation material. The insulation material may be a material having insulation properties and not having ion conduction properties. For example, the insulation material may be at least one selected from the group consisting of an epoxy resin, an acrylic resin, a polyimide resin, and silsesquioxane.

The sealing member 760 may contain a plurality of different insulation materials. For example, the sealing member 760 may have a multi-layer structure. The layers of the multi-layer structure may be formed using different materials and may have different properties.

The sealing member 760 may contain a particulate metal oxide material. Silicon oxide, aluminum oxide, titanium oxide, zinc oxide, cerium oxide, iron oxide, tungsten oxide, zirconium oxide, calcium oxide, zeolite, glass, or the like can be used as the metal oxide material. For example, the sealing member 760 may be formed using a resin material in which a plurality of particles made of the metal oxide material is dispersed.

The particle size of the metal oxide material may be any size as long as it is less than or equal to the interval between the electrode current collector 111 and the counter electrode current collector 121. The particle shape of the metal oxide material is, for example, a sphere, an ellipsoid, or a rod, but is not limited thereto.

Providing the sealing member 760 makes it possible to improve the reliability of the battery 701 in various aspects such as mechanical strength, short-circuit prevention, moisture proofing, and the like.

Eighth Embodiment

Next, an eighth embodiment will now be described.

A battery according to the eighth embodiment is different from a battery according to the first embodiment in that it includes a sealing member. A description will be given below with a focus on the points of difference from the first to seventh embodiments, and the points of sameness will not be described or will be described in a simplified manner.

Figure 14:
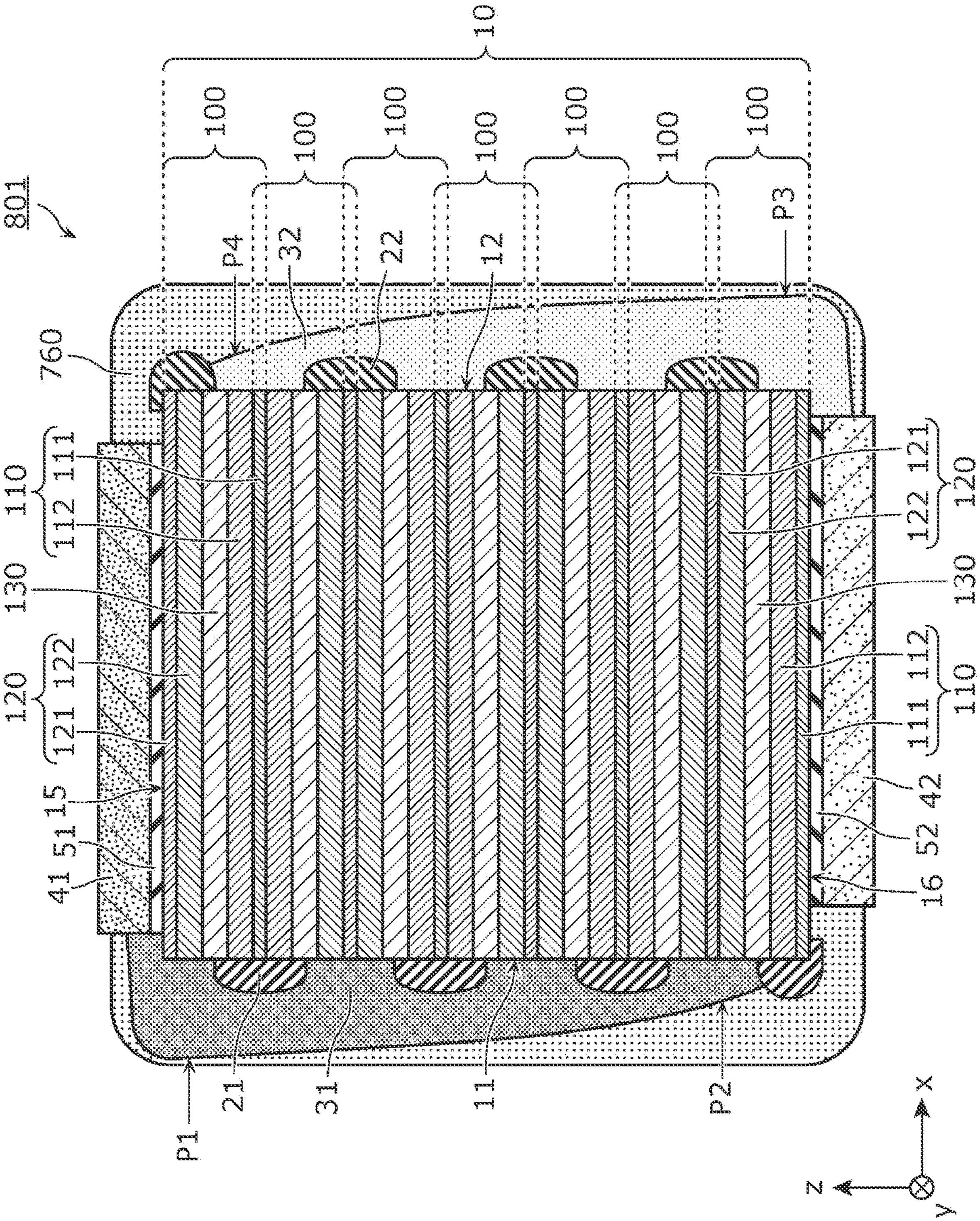
FIG. 14 is a cross-sectional view of a battery according to an eighth embodiment.

FIG. 14 is a cross-sectional view of a battery 801 according to the present embodiment. As illustrated in FIG. 14, the battery 801 is different from the battery 1 according to the first embodiment in that it includes the sealing member 760.

Also in the battery 801, similarly to the battery 701, the sealing member 760 exposes at least a part of each of the counter electrode current collector terminal 41 and the electrode current collector terminal 42 and encapsulates the power-generating element 10. The sealing member 760 is, for example, provided in such a way as not to expose the power-generating element 10, the electrode insulation layer 21, the counter electrode insulation layer 22, the counter electrode lead layer 31, and the electrode lead layer 32.

In addition, in the battery 801, though the opposite surface of the counter electrode lead layer 31, which is the opposite of the side-surface-(11)-side surface, and the opposite surface of the electrode lead layer 32, which is the opposite of the side-surface-(12)-side surface, are inclined with respect to the laminating direction, the shape of the battery 801 is configured to be a rectangular parallelepiped by being encapsulated by the sealing member 760.

Providing the sealing member 760 makes it possible to improve the reliability of the battery 801 in various aspects such as mechanical strength, short-circuit prevention, moisture proofing, and the like.

Ninth Embodiment

Next, a ninth embodiment will now be described.

A battery according to the ninth embodiment is different from a battery according to the third embodiment in that a current collector used as a current collector terminal is thin and in that it includes a sealing member. A description will be given below with a focus on the points of difference from the first to eighth embodiments, and the points of sameness will not be described or will be described in a simplified manner.

Figure 15:
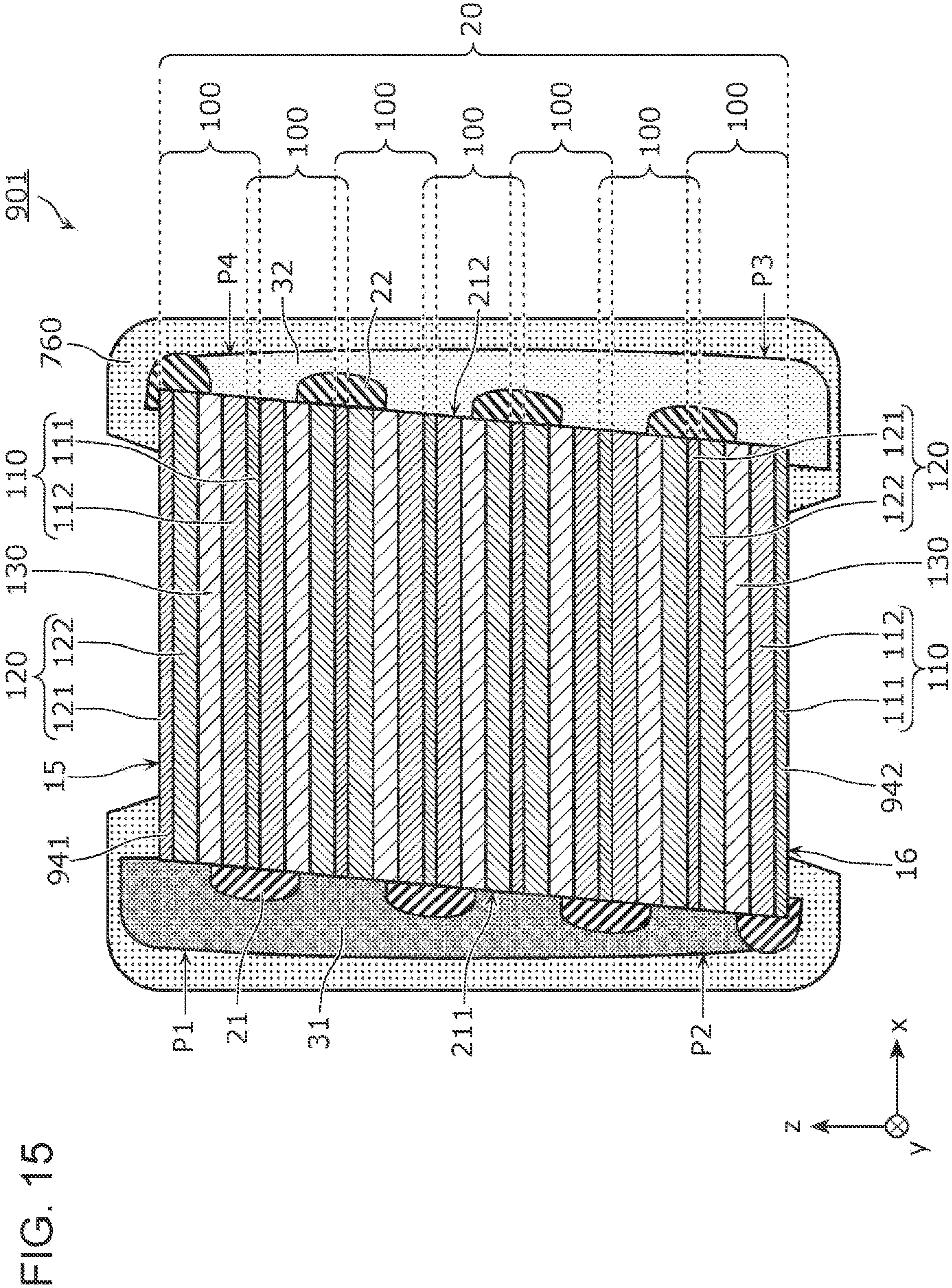
FIG. 15 is a cross-sectional view of a battery according to a ninth embodiment.

FIG. 15 is a cross-sectional view of a battery 901 according to the present embodiment. As illustrated in FIG. 15, the battery 901 is different from the battery 301 according to the third embodiment in that it includes the power-generating element 20 in place of the power-generating element 30 and includes the sealing member 760.

In the battery 901, the counter electrode current collector 121 located at the uppermost layer functions as a counter electrode current collector terminal 941. That is, the counter electrode current collector terminal 941 is the member constituting the principal surface 15, that is, the counter electrode current collector 121 located at the uppermost layer. The electrode current collector 111 located at the lowermost layer functions as an electrode current collector terminal 942. That is, the electrode current collector terminal 942 is the member constituting the principal surface 16, that is, the electrode current collector 111 located at the lowermost layer.

It is possible to reduce the number of parts by causing the counter electrode current collector 121 located at the uppermost layer to function as the counter electrode current collector terminal 941 and causing the electrode current collector 111 located at the lowermost layer to function as the electrode current collector terminal 942.

In addition, in the battery 901, the sealing member 760 exposes at least a part of each of the counter electrode current collector 121 located at the uppermost layer and functioning as the counter electrode current collector terminal 941, and the electrode current collector 111 located at the lowermost layer and functioning as the electrode current collector terminal 942, and encapsulates the power-generating element 20. An opening portion is provided through the sealing member 760 on each of the principal surfaces 15 and 16 to expose a part of the corresponding one of the counter electrode current collector 121 located at the uppermost layer and the electrode current collector 111 located at the lowermost layer.

Providing the sealing member 760 makes it possible to improve the reliability of the battery 901 in various aspects such as mechanical strength, short-circuit prevention, moisture proofing, and the like.

Tenth Embodiment

Next, a tenth embodiment will now be described.

A battery according to the tenth embodiment is different from a battery according to the first embodiment in that not the thickness of a lead layer but the conductivity of the lead layer differs from portion to portion of the lead layer. A description will be given below with a focus on the points of difference from the first to ninth embodiments, and the points of sameness will not be described or will be described in a simplified manner.

Figure 16:
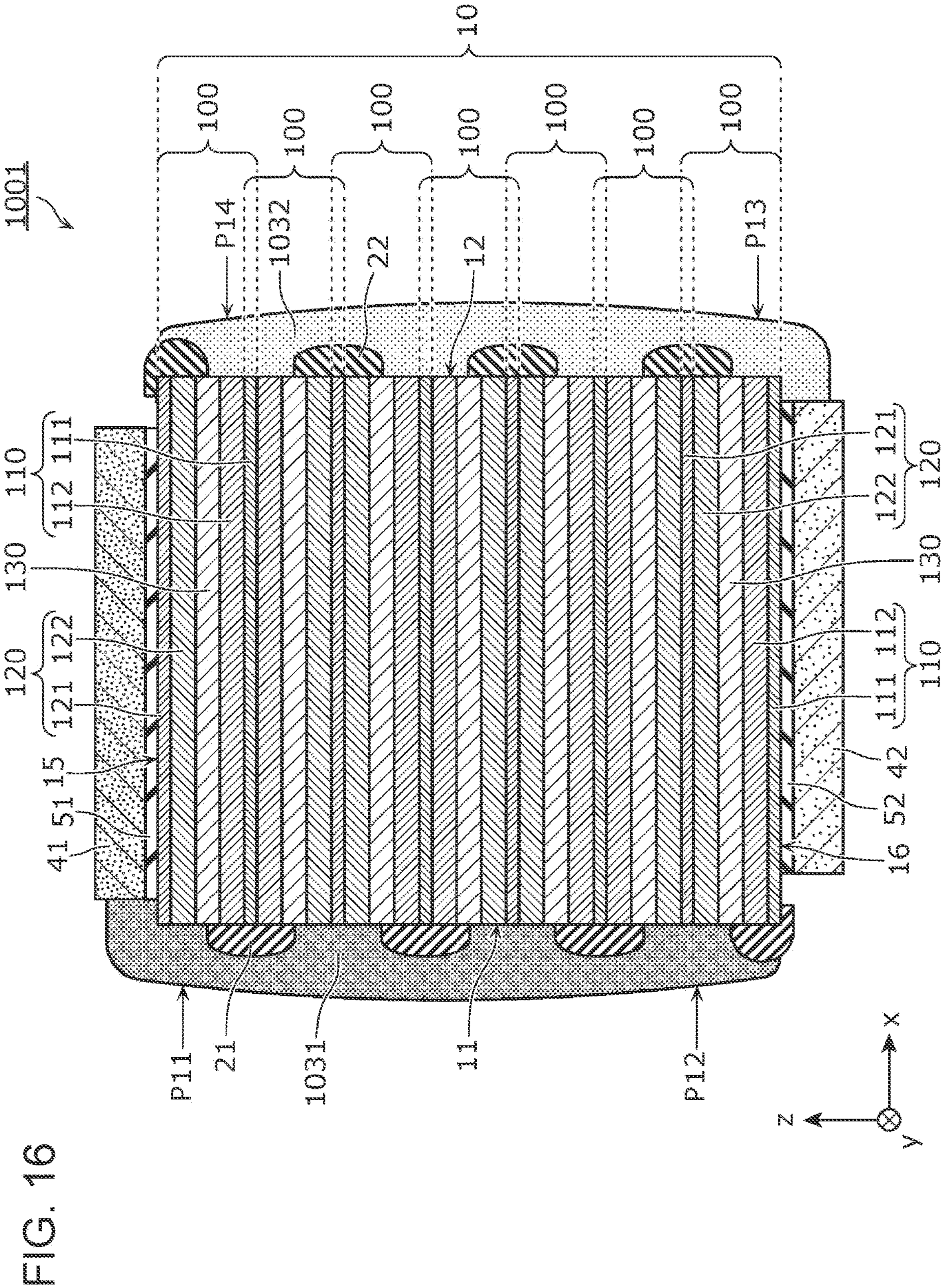
FIG. 16 is a cross-sectional view of a battery according to a tenth embodiment.

FIG. 16 is a cross-sectional view of a battery 1001 according to the present embodiment. As illustrated in FIG. 16, the battery 1001 is different from the battery 1 according to the first embodiment in that it includes a counter electrode lead layer 1031 and an electrode lead layer 1032 in place of the counter electrode lead layer 31 and the electrode lead layer 32.

The counter electrode lead layer 1031 includes a first portion P11, which is connected to the counter electrode layer 120 of the battery cell 100 disposed closest to the principal surface 15 among the plurality of battery cells 100, and a second portion P12, which is connected to the counter electrode layer 120 of the battery cell 100 disposed farthest from the principal surface 15 among the plurality of battery cells 100.

In the counter electrode lead layer 1031, the conductivity of a material of which the first portion P11 is made is higher than the conductivity of a material of which the second portion P12 is made. In the counter electrode lead layer 1031, the thickness of the first portion P11 is the same as the thickness of the second portion P12; therefore, because of the above relationship between the conductivities, the resistance of the first portion P11 is lower than the resistance of the second portion P12. As described above, it is possible to make the resistance of the first portion Pillow without making the first portion P11 thicker than the second portion P12; therefore, it is possible to make the size of the battery 1001 smaller.

The electrode lead layer 1032 includes a third portion P13, which is connected to the electrode layer 110 of the battery cell 100 disposed closest to the principal surface 16 among the plurality of battery cells 100, and a fourth portion P14, which is connected to the electrode layer 110 of the battery cell 100 disposed farthest from the principal surface 16 among the plurality of battery cells 100.

In the electrode lead layer 1032, the conductivity of a material of which the third portion P13 is made is higher than the conductivity of a material of which the fourth portion P14 is made. In the electrode lead layer 1032, the thickness of the third portion P13 is the same as the thickness of the fourth portion P14; therefore, because of the above relationship between the conductivities, the resistance of the third portion P13 is lower than the resistance of the fourth portion P14. As described above, it is possible to make the resistance of the third portion P13 low without making the third portion P13 thicker than the fourth portion P14; therefore, it is possible to make the size of the battery 1001 smaller.

The counter electrode lead layer 1031 and the electrode lead layer 1032 are formed using a resin material having conductivity or the like. The resin material having conductivity contains, for example, a resin, and a conductive material filled in the resin and comprised of metal particles, etc.

In the counter electrode lead layer 1031, for example, the filling density of the conductive material at the first portion P11 is higher than the filling density of the conductive material at the second portion P12, and this makes the conductivity of the first portion P11 higher than the conductivity of the second portion P12. The conductivity of the first portion P11 may be made higher than the conductivity of the second portion P12 by using, as the conductive material at the first portion P11, a conductive material whose conductivity is higher than the conductivity of the conductive material at the second portion P12.

For example, in a case where the counter electrode lead layer 1031 is formed using a resin material having conductivity, the resin material is applied onto the side surface 11 in such a way as to form a thicker coat at a portion desired to have higher conductivity, and the applied resin material is then pressed to make the thickness uniform, resulting in higher conductivity at the thicker-coating-applied portion. The counter electrode lead layer 1031 may be formed by applying resin materials having different conductivities in a conductivity-differentiating manner.

Also for the electrode lead layer 1032, it is possible to make the conductivity of the third portion P13 higher than the conductivity of the fourth portion P14 by using the same method as that of the counter electrode lead layer 1031.

Manufacturing Method

Next, a method for manufacturing a battery according to each embodiment having been described above will now be described.

Figure 17:
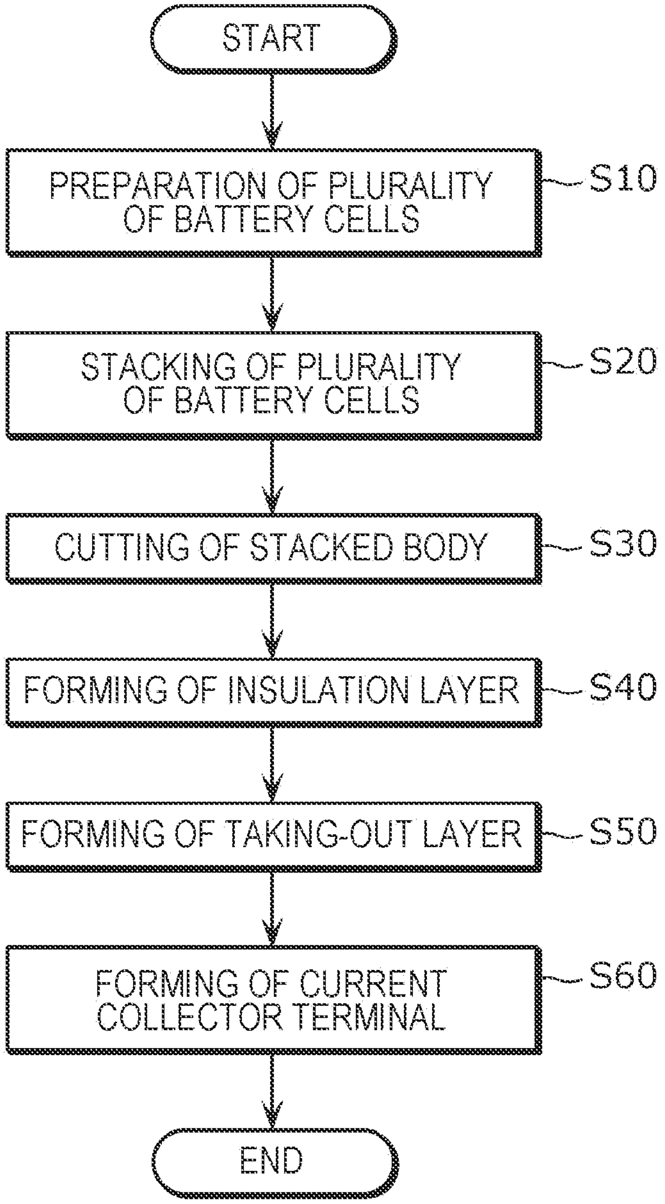
FIG. 17 is a flowchart illustrating a method for manufacturing a battery according to an embodiment.

FIG. 17 is a flowchart illustrating an example of a method for manufacturing a battery according to each embodiment. In the description below, the battery 201 according to the second embodiment will be taken as an example.

As illustrated in FIG. 17, first, a plurality of battery cells is prepared (step S10). The battery cells prepared are, for example, the battery cells 100A, 100B, and 100C illustrated in FIGS. 3A to 3C.

Next, the plural battery cells 100 are laminated (step S20). Specifically, a laminated body, in which the plural battery cells 100 are laminated one on top of another such that the order of arrangement of the electrode layer 110, the counter electrode layer 120, and the solid electrolyte layer 130 therebetween alternates, is formed. In the present embodiment, for example, the power-generating element 10 illustrated in FIG. 4 is formed by laminating the battery cells 100A, 100B, and 100C in a combined manner as appropriate. The power-generating element 10 is an example of the laminated body.

Next, the laminated body is cut (step S30). Specifically, by cutting the laminated body comprised of the plurality of battery cells 100 together, it is possible to form the power-generating element 20 each side surface of which is formed of the cut surface. For this reason, each side surface having been formed is flat. The power-generating element 20 is an example of the laminated body. When the cut surfaces corresponding to the side surfaces 211 and 212 are formed, the cutting is performed in a direction inclined with respect to the laminating direction. The cutting is performed using, for example, a blade, laser, jet, or the like. In a case where a battery that includes the power-generating element 10, for example, the battery 1, is manufactured, step S30 may be omitted. In addition, all of the cut surfaces may be formed through cutting in the laminating direction. Also, in a case where the power-generating element 20 is formed, step S30 may be omitted by forming the power-generating element 20 by laminating a plurality of end-face-inclined battery cells.

Next, insulation layers are formed on side surfaces of the power-generating element 20 (step S40). Specifically, the electrode insulation layer 21 covering the electrode layer 110 is formed on the side surface 211. The counter electrode insulation layer 22 covering the counter electrode layer 120 is formed on the side surface 212.

The electrode insulation layer 21 and the counter electrode insulation layer 22 are formed by, for example, applying and then curing a resin material having fluidity. The applying is performed using an ink-jet method, a spray method, a screen printing method, a gravure printing method, or the like. The curing is performed using drying, heating, light irradiation, or the like, depending on what kind of resin material is used.

When the electrode insulation layer 21 and the counter electrode insulation layer 22 are formed, in order to avoid the end face of the counter electrode current collector 121 and the end face of the electrode current collector 111 from being insulated, processing may be performed to form a protection member by using a tape or the like for masking regions where no insulation layer should be formed or through resist processing. It is possible to ensure the conductivity of each current collector by removing the protection member after forming the electrode insulation layer 21 and the counter electrode insulation layer 22.

Next, lead layers are formed on side surfaces of the power-generating element 20 (step S50). Specifically, the counter electrode lead layer 31 that is electrically connected to the plurality of counter electrode layers 120 is formed in such a way as to cover the principal surface 15 and the side surface 211 of the power-generating element 20 and the electrode insulation layer 21. The electrode lead layer 32 that is electrically connected to the plurality of electrode layers 110 is formed in such a way as to cover the principal surface 16 and the side surface 212 of the power-generating element 20 and the counter electrode insulation layer 22.

For example, a conductive paste such as a conductive resin is applied and then cured in such a way as to cover an end portion of the principal surface 15 along the side surface 211, the electrode insulation layer 21, and a portion, of the side surface 211, not covered by the electrode insulation layer 21, thereby forming the counter electrode lead layer 31. In addition, a conductive resin is applied and then cured in such a way as to cover an end portion of the principal surface 16 along the side surface 212, the counter electrode insulation layer 22, and a portion, of the side surface 212, not covered by the counter electrode insulation layer 22, thereby disposing the electrode lead layer 32. The counter electrode lead layer 31 and the electrode lead layer 32 may be formed using, for example, printing, plating, vapor deposition, sputtering, welding, soldering, bonding, or any other method.

In addition, in step S50, the counter electrode lead layer 31 is formed such that the resistance of the first portion P1 of the counter electrode lead layer 31 is lower than the resistance of the second portion P2 of the counter electrode lead layer 31. Specifically, the counter electrode lead layer 31 is formed such that the thickness of the counter electrode lead layer 31 at the first portion P1 is greater than the thickness of the counter electrode lead layer 31 at the second portion P2. For example, a conductive resin is applied in such an application pattern that makes the second portion P2 thicker than the first portion P1. A conductive resin may be applied more than once to form a plurality of conductive films in a laminated manner such that the number of the conductive films in the laminated body at the first portion P1 is larger than at the second portion P2. The second portion P2 of the counter electrode lead layer 31 after the applying with a uniform thickness may be shaved.

The electrode lead layer 32 is formed in the same manner as the counter electrode lead layer 31 such that the resistance of the third portion P3 of the electrode lead layer 32 is lower than the resistance of the fourth portion P4 of the electrode lead layer 32. Specifically, the electrode lead layer 32 is formed such that the thickness of the electrode lead layer 32 at the third portion P3 is greater than the thickness of the electrode lead layer 32 at the fourth portion P4.

Next, a current collector terminal is formed on each of the principal surfaces 15 and 16 of the power-generating element 20 (step S60). Specifically, the counter electrode current collector terminal 41 is formed indirectly on the principal surface 15, with the counter electrode intermediate layer 51 interposed therebetween. In this process, the counter electrode current collector terminal 41 is formed in such a way as to be connected to the counter electrode lead layer 31. In addition, the electrode current collector terminal 42 is formed indirectly on the principal surface 16, with the electrode intermediate layer 52 interposed therebetween. In this process, the electrode current collector terminal 42 is formed in such a way as to be connected to the electrode lead layer 32. The counter electrode current collector terminal 41 and the electrode current collector terminal 42 are formed by disposing a conductive material such as a metal material at a desired region using plating, printing, soldering, or the like. Alternatively, the counter electrode current collector terminal 41 and the electrode current collector terminal 42 may be formed by welding or bonding a metal sheet or the like.

The counter electrode intermediate layer 51 and the electrode intermediate layer 52 are formed by, for example, applying and then curing a resin material having fluidity. The applying is performed using an ink-jet method, a spray method, a screen printing method, a gravure printing method, or the like. The curing is performed using drying, heating, light irradiation, or the like, depending on what kind of resin material is used.

The battery 201 illustrated in FIG. 7 can be manufactured through the processes described above.

A pressing process may be executed to press the plurality of battery cells 100 having been prepared in step S10 in the laminating direction individually or after the laminating of the plurality of battery cells.

The counter electrode intermediate layer 51 and the electrode intermediate layer 52 may be formed next after the forming of the electrode insulation layer 21 and the counter electrode insulation layer 22, or concurrently with the forming of the electrode insulation layer 21 and the counter electrode insulation layer 22, in step S40. Alternatively, the counter electrode intermediate layer 51 and the electrode intermediate layer 52 may be formed after the forming of the laminated body (step S20) and before the cutting of the laminated body (step S30), or after the cutting of the laminated body (step S30) and before the forming of the insulation layers (step S40).

The forming of the current collector terminals (step S60) may be performed any time after the preparation of the plurality of battery cells (step S10).

In a case where the battery 401 is manufactured, the first conductive members 431*a* and 432*a* illustrated in FIG. 9 may be formed after the cutting of the laminated body (step S30) and before the forming of the lead layers (step S50). The first conductive members 431*a* and 432*a* may be formed using, for example, printing, plating, vapor deposition, sputtering, welding, soldering, bonding, or any other method.

In a case where the battery 701 is manufactured, the sealing member 760 illustrated in FIGS. 12, 13A, and 13B may be formed after the forming of the lead layers (step S50) or the forming of the current collector terminals (step S60). The sealing member 760 is formed by, for example, applying and then curing a resin material having fluidity. The applying is performed using an ink-jet method, a spray method, a screen printing method, a gravure printing method, or the like. The curing is performed using drying, heating, light irradiation, or the like, depending on what kind of resin material is used.

A thick current collector terminal, for example, the counter electrode current collector terminal 341 and the electrode current collector terminal 342 illustrated in FIG. 8, can be formed by laminating a metal layer on a current collector having the same thickness as each thickness of the other counter electrode current collectors 121 and the other electrode current collectors 111 using adhesive gluing, applying, welding, bonding, or the like. Alternatively, the battery cell 302, 303 may be formed using a thick metal foil or a thick metal sheet as a current collector functioning as a current collector terminal.

Other Embodiments

Though a battery and a method for manufacturing a battery according to one mode or a plurality of modes have been described above on the basis of embodiments, the present disclosure shall not be construed restrictively within the literal metes and bounds of these embodiments. Modes obtained by applying various kinds of variation which those skilled in the art can think of to each embodiment, and modes constructed by combining constituent elements in different embodiments, are also encompassed within the scope of the present disclosure unless the variation constitutes a departure from the spirit of the present disclosure.

For example, though examples in which one current collector is shared by and between battery cells disposed adjacent to each other have been described/illustrated in the foregoing embodiments, the current collector does not necessarily have to be shared. Two counter electrode current collectors may be laid on each other, and two electrode current collectors may be laid on each other.

As another variation, for example, though the first side surface on which the counter electrode lead layer is provided and the second side surface on which the electrode lead layer is provided are located opposite of each other in the examples having been described/illustrated in the foregoing embodiments, this does not imply any limitation. For example, the first side surface and the second side surface may be side surfaces located adjacent to each other.

As another variation, for example, the first side surface may lie at the same side surface as the second side surface. For example, in a case where the power-generating element is a rectangular parallelepiped, the power-generating element has four side surfaces. A partial region of one of the four side surfaces may be the first side surface, and another region thereof may be the second side surface.

As another variation, for example, though the battery cell includes a set of the electrode layer, the counter electrode layer, and the solid electrolyte layer in the foregoing embodiments, this does not imply any limitation. The battery cell may be a battery cell in which plural sets of the electrode layer, the counter electrode layer, and the solid electrolyte layer are electrically connected in series. In this case, for example, the end faces of the electrode layers and the counter electrode layers other than the electrode layer and the counter electrode layer located at the respective two ends of the battery cell in the laminating direction are covered by the insulation layers.

Various kinds of change, replacement, addition, omission, and the like can be made to each of the foregoing embodiments within the scope of the appended claims and equivalents thereof.

The present disclosure can be applied as a battery for, for example, electronic equipment, an electric appliance, an electric vehicle, and the like.

What is claimed is:

1. A battery, comprising:

a power-generating element including a plurality of battery cells each including an electrode layer, a counter electrode layer, and a solid electrolyte layer located between the electrode layer and the counter electrode layer, the plurality of battery cells being electrically connected in parallel and being laminated;

an electrode insulation member covering the electrode layer of each of the plurality of battery cells at a first side surface of the power-generating element;

a counter electrode lead layer covering the first side surface and the electrode insulation member and electrically connected to the counter electrode layer of each of the plurality of battery cells; and a counter electrode current collector terminal provided at a first principal surface of the power-generating element and connected to the counter electrode lead layer, wherein a resistance of a first portion, of the counter electrode lead layer, connected to the counter electrode layer of a battery cell disposed closest to the first principal surface among the plurality of battery cells is lower than a resistance of a second portion, of the counter electrode lead layer, connected to the counter electrode layer of a battery cell disposed farthest from the first principal surface among the plurality of battery cells.

2. The battery according to claim 1, wherein a thickness of the counter electrode lead layer at the first portion is greater than a thickness of the counter electrode lead layer at the second portion.

3. The battery according to claim 2, wherein the first side surface is inclined with respect to a laminating direction of the power-generating element to configure an interior angle formed by the first side surface and the first principal surface as an obtuse angle.

4. The battery according to claim 2, wherein a height of the counter electrode lead layer from the first side surface increases toward the counter electrode current collector terminal in a laminating direction of the power-generating element.

5. The battery according to claim 1, wherein the counter electrode lead layer covers the first principal surface.

6. The battery according to claim 1, wherein the counter electrode current collector terminal is a current collector constituting the first principal surface, and a thickness of the counter electrode current collector terminal is greater than a thickness of a current collector included in one of the plurality of battery cells.

7. The battery according to claim 1, wherein the counter electrode lead layer includes a first conductive member being in contact with the counter electrode layer, and a second conductive member covering the first conductive member.

8. The battery according to claim 1, wherein a conductivity of a material of which the first portion is made is higher than a conductivity of a material of which the second portion is made.

9. The battery according to claim 1, further comprising:

a counter electrode insulation member covering the counter electrode layer of each of the plurality of battery cells at a second side surface of the power-generating element;

an electrode lead layer covering the second side surface and the counter electrode insulation member and electrically connected to the electrode layer of each of the plurality of battery cells; and an electrode current collector terminal provided at the first principal surface of the power-generating element and connected to the electrode lead layer, wherein a resistance of a third portion, of the electrode lead layer, connected to the electrode layer of the battery cell disposed closest to the first principal surface among the plurality of battery cells is lower than a resistance of a fourth portion, of the electrode lead layer, connected to the electrode layer of the battery cell disposed farthest from the first principal surface among the plurality of battery cells.

10. The battery according to claim 9, wherein a thickness of the electrode lead layer at the third portion is greater than a thickness of the electrode lead layer at the fourth portion.

11. The battery according to claim 10, wherein the first side surface and the second side surface are located opposite of each other, a cross-sectional shape of the power-generating element when cut in a laminating direction of the power-generating element at a position going through the first side surface and the second side surface is a trapezoid, and each of an interior angle formed by the first side surface and the first principal surface and an interior angle formed by the second side surface and the first principal surface is an obtuse angle.

12. The battery according to claim 1, further comprising:

a counter electrode insulation member covering the counter electrode layer of each of the plurality of battery cells at a second side surface of the power-generating element;

an electrode lead layer covering the second side surface and the counter electrode insulation member and electrically connected to the electrode layer of each of the plurality of battery cells; and an electrode current collector terminal provided at a second principal surface, the second principal surface being an opposite of the first principal surface of the power-generating element, and connected to the electrode lead layer, wherein a resistance of a third portion, of the electrode lead layer, connected to the electrode layer of a battery cell disposed closest to the second principal surface among the plurality of battery cells is lower than a resistance of a fourth portion, of the electrode lead layer, connected to the electrode layer of a battery cell disposed farthest from the second principal surface among the plurality of battery cells.

13. The battery according to claim 12, wherein a thickness of the electrode lead layer at the third portion is greater than a thickness of the electrode lead layer at the fourth portion.

14. The battery according to claim 13, wherein the first side surface and the second side surface are located opposite of each other, a cross-sectional shape of the power-generating element when cut in a laminating direction of the power-generating element at a position going through the first side surface and the second side surface is a parallelogram, and each of an interior angle formed by the first side surface and the first principal surface and an interior angle formed by the second side surface and the second principal surface is an obtuse angle.

15. The battery according to claim 12, wherein the electrode current collector terminal is a current collector constituting the second principal surface, and a thickness of the electrode current collector terminal is greater than a thickness of a current collector included in one of the plurality of battery cells.

16. The battery according to claim 9, wherein a height of the electrode lead layer from the second side surface increases toward the electrode current collector terminal in a laminating direction of the power-generating element.

17. The battery according to claim 1, wherein the electrode insulation member contains a resin.

18. The battery according to claim 1, further comprising:

a sealing member exposing at least a part of the counter electrode current collector terminal and encapsulating the power-generating element and the counter electrode lead layer.

19. A method for manufacturing a battery, comprising:

preparing a plurality of battery cells each including an electrode layer, a counter electrode layer, and a solid electrolyte layer located between the electrode layer and the counter electrode layer;

forming a laminated body in which the plurality of battery cells are laminated one on top of another while alternating an order of arrangement of the electrode layer, the counter electrode layer, and the solid electrolyte layer from a battery cell to a battery cell;

covering the electrode layer of each of the plurality of battery cells at a first side surface of the laminated body by an electrode insulation member;

covering the first side surface and the electrode insulation member by a counter electrode lead layer electrically connected to the counter electrode layer of each of the plurality of battery cells; and providing a counter electrode current collector terminal connected to the counter electrode lead layer at a first principal surface of the laminated body, wherein in the covering by the counter electrode lead layer, the counter electrode lead layer is formed such that a resistance of a first portion, of the counter electrode lead layer, connected to the counter electrode layer of a battery cell disposed closest to the first principal surface among the plurality of battery cells is lower than a resistance of a second portion, of the counter electrode lead layer, connected to the counter electrode layer of a battery cell disposed farthest from the first principal surface among the plurality of battery cells.

20. The method for manufacturing a battery according to claim 19, wherein in the covering by the counter electrode lead layer, the counter electrode lead layer is formed to configure a thickness of the counter electrode lead layer at the first portion greater than a thickness of the counter electrode lead layer at the second portion.

* * * * *